United States Patent [19]

Kanatzidis et al.

[11] Patent Number: 5,531,936
[45] Date of Patent: Jul. 2, 1996

[54] ALKALI METAL QUATERNARY CHALCOGENIDES AND PROCESS FOR THE PREPARATION THEREOF

[75] Inventors: Mercouri G. Kanatzidis, Okemos; Ju H. Liao, Lansing; Gregory A. Marking, Okemos, all of Mich.

[73] Assignee: Board of Trustees operating Michigan State University, East Lansing, Mich.

[21] Appl. No.: 298,620

[22] Filed: Aug. 31, 1994

[51] Int. Cl.$^6$ ............................... F21V 9/04; G02B 5/20; C01B 19/00; C01B 17/00
[52] U.S. Cl. ............................ 252/587; 252/582; 252/584; 423/508; 423/511
[58] Field of Search ................................ 252/587, 584, 252/582; 423/508, 511; 359/326, 328

[56] References Cited

U.S. PATENT DOCUMENTS

| | | |
|---|---|---|
| 3,124,426 | 3/1964 | Offergeld et al. . |
| 3,480,409 | 11/1969 | Dillon et al. . |
| 3,688,109 | 8/1972 | Gamble . |
| 3,696,038 | 10/1972 | Davies et al. . |
| 3,803,044 | 4/1974 | Carnall et al. . |
| 4,237,201 | 12/1980 | Rouxel et al. ......................... 423/511 |
| 4,258,109 | 3/1981 | Liang . |
| 4,366,141 | 12/1982 | Martin . |
| 4,730,896 | 3/1988 | Katsuyama et al. . |
| 4,751,022 | 6/1988 | Sugio et al. . |
| 4,789,500 | 12/1988 | Morimoto et al. . |
| 5,051,204 | 9/1991 | Ohsawa et al. ......................... 423/508 |

OTHER PUBLICATIONS

Kanatzidis, M. G., Materials 2 353–363 (1990).
Liao et al, Inorganic Chem 32 2453–2462 (1993).
Voevodina, O. V., et al Zhurnal Neorganicheskoi Khimii 37, 2776–2779 (1992).
Teske, Chr. L., et al., Anorg. Allg. Chem. 427:200–203 (1976).
Teske, Chr. L. Z., Anorg. Allg. Chem. 445:193–201 (1978).
Teske, Chr. L. Z., Naturforsch 35B:7–11 (1980).
Teske, Chr. L. Z., Anorg. Allg. Chem. 419:67–76 (1976).
Teske, Chr. L., et al., Anorg. Allg. Chem. 426:281–287 (1976).
Teske, Chr. L. Z., Anorg. Allg. Chem. 460:163–168 (1980).
Teske, Chr. L. Z., Anorg. Allg. Chem. 522:122–130 (1985).
Teske, Chr. L. Z., Naturforsch 35B:509–510 (1980).
Teske, Chr. L. Z., Naturforsch, 34B:544–547 (1979).
Sunshine, S., et al., J. Am. Chem. Soc. 109:6202–6204 (1987).
Kanatzidis, M. G., et al., J. Am. Chem. Soc. 111:3767–3769 (1989).
Park, Y., et al., Angew. Chem. Int. Ed. Engl. 29:914–915 (1990).
Park, Y., et al., Angew, Chem. Int. Ed. Engl. 30:1325–1328 (1991).
Kanatzidis, M. G., et al., CHem. Mater. 2:99–101 (1990).
Keane, P. M., et al., Acc. of Chem. Res. 24:223–229 (1991).
Lu, Y.–J., et al., Inorg. Chem. 30:3317–3320 (1991).
Lu, Y.–J., et al., J. Solid State Chem. 98:312–317 (1992).
Susa, K., et al., J. Solid State Chem. 3:75–82 (1971).
Jumas, J. C., et al., Cryst. Struct. Common. 2:157 (1973).
Olivier–Fourcade, J., et al., Rev. Chim. Miner. 9:757–770 (1972).
Eisenmann, B., et al., Anorg. Allg. Chem. 516:49–53 (1984).
Pohl, S., et al., Naturforsch 28B:565 (1973).
Krebs, B., et al., Angew. Chem. Int. Ed. Engl. 9:897 (1970).
Krebs, B., et al., Naturforsch 26B:853–854 (1971).
Pohl, S., et al., Anorg. Allg. Chem. 424:265–272 (1976).
Philippot, E., et al., Rev. Chim. Miner. 8:477–489 (1971).
Klemm, W., et al., Z. Anorg. Allg. Chem. 241:305–323 (1939).
Haeuseler et al, Z. Naturforsch, 44b:1035–1036 (1989).

*Primary Examiner*—Philip Tucker
*Attorney, Agent, or Firm*—Ian C. McLeod

[57] ABSTRACT

Alkali metal quaternary chalcogenides and process for the preparation. The chalcogenides have the formula $A_xB_yC_zD_n$ containing $(CD_4)^{4-}$ or $(C_2D_6)^{4-}$ ions where A is selected from the group consisting of an alkali metal and a mixture of alkali metals, B is selected from the group consisting of mercury, zinc and manganese, C is a metal selected from the group consisting of germanium and tin and D is selected from the group consisting of sulfur and selenium, wherein x, y, z and n are molar amounts which provide non-linear optical transmission properties. These chalcogenides are useful as non-linear optical transmission crystals.

25 Claims, 19 Drawing Sheets

FIG.I

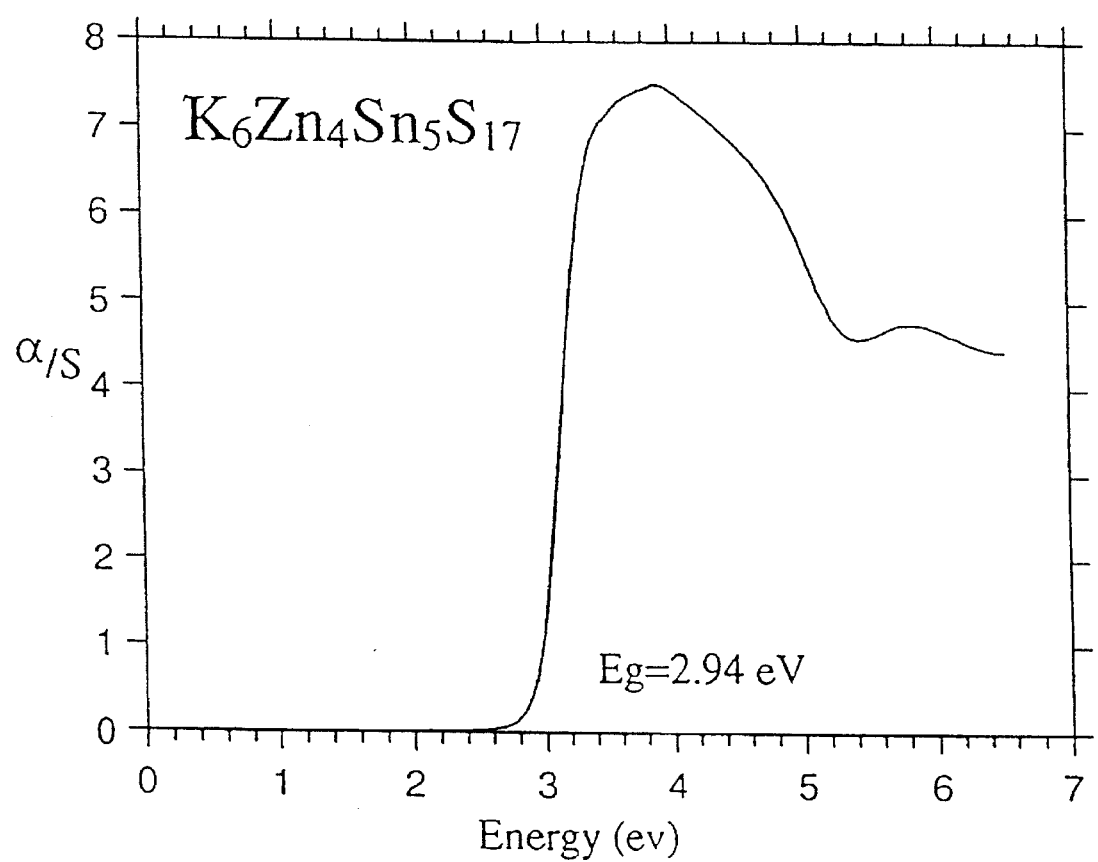
FIG. IIC

LT (Aba2)

$K_2Hg_3Ge_2S_8$      400°C

HT (C2)

(KRb)$_2$Hg$_3$Ge$_2$S$_8$    400°C

Rb$_2$Hg$_3$Ge$_2$S$_8$    > 450°C

5,531,936

ALKALI METAL QUATERNARY CHALCOGENIDES AND PROCESS FOR THE PREPARATION THEREOF

BACKGROUND OF THE INVENTION

1. Field of the Invention

The present invention relates to novel alkali metal quaternary chalcogenides containing $(CD_4)^{4-}$ or $(C_2D_6)^{4-}$ ions, wherein C is germanium or tin and D is S or Se, and the process for the preparation of such compounds using molten fused salts. In particular, the present invention relates to such chalcogenides having non-linear optical transmission properties.

2. Description of Related Art

From the structural point of view, quaternary chalcogenides are interesting due to their structural varieties resulting from the combination in different ratios of two kinds of metal centers with different size, coordination preference and arrangement. Alkali earth metal containing quaternary chalcogenides have been extensively investigated using high temperature solid state synthesis (a) Teske, Chr. L. Z., Anorg. Allg. Chem. 445:193–201 (1978); (b) Teske, Chr. L., Vetter, O. Z., Anorg. Allg. Chem. 427:200–204 (1976); (c) Teske, Chr. L. Z., Naturforsch 35b:7–11 (1980); (d) Teske, Chr. L. Z., Anorg. Allg. Chem., 419:67–76 (1976); (e) Teske, Chr. L., Vetter, O. Z., Anorg. Allg. Chem. 426:281–287 (1976); (f) Teske, Chr. L. Z., Anorg. Allg. Chem. 460:163–168 (1980); (g) Teske, Chr. L. Z., Anorg. Allg. Chem. 522:122–130 (1985); (h) Teske, Chr. L. Z., Naturforsch 35b:509–510 (1980); (i) Teske, Chr. L. Z., Naturforsch, 34b:544–547 (1979)). Recently molten alkali metal salts have been proven to be convenient reaction media for chalcogenide synthesis at lower temperature regimes (<500° C.). So far, most of the research has focused on ternary systems ((a) Kanatzidis, M. G., Chem. Mater. 2:353–363 (1990); (b) Sunshine et al., J. Am. Chem. Soc. 109:6202–6204 (1987); (c) Kanatzidis, M. G., et al., J. Am. Chem. Soc. 111:3767–3769 (1989); (d) Liao, J.-H., et al., Inorg. Chem. 32:2453–2462 (1993); (e) Park, Y., et al., Angew. Chem. Int. Ed. Engl. 29:914–915 (1990); (f) Park, Y., et al., Angew. Chem. Int. Ed. Engl. 30:1325–1328 (1991); (g) Kanatzidis, M. G., et al., Chem. Mater. 2:99–101 (1990); (h) Kanatzidis, M. G., et al., Chem. Mater. 2:353–363 (1990); (i) Park, Y., Dissertation, Michigan State University (1992)). Less effort has been expended on quaternary chalcogenides ((a) Keane, P. M., et al., Acc. of Chem. Res., 24:223–229 (1991); (b) Lu, Y.-J, et al., Inorg. Chem. 30:3317–3320 (1991); (c) Lu, Y.-J., et al., J. Solid State Chem. 98:312–317 (1992); (d) Wu, P., et al., J. Solid State Chem. 97:383–390 (1992)).

A series of alkali metal mixed Sn/Cu or Au quaternary chalcogenides have been reported (Liao, J.-H, et al., Chem. Mater. 5:1561–1569 (1993)). Molten salt techniques have been shown to be promising for synthesizing quaternary chalcogenides. Alkali metal salts with $(SnS_4)^{4-}$ and/or $(Sn_2S_6)^{4-}$ have been characterized ((a) Susa, K., et al., J. Solid State Chem. 3:75–82 (1971); (b) Jumas, J. C., et al., Cryst. Struct. Comm. 2:157 (1973); (c) Schiwy, W., et al., Anorg. Allg. Chem. 402:77–86 (1973); (d) Krebs, B., et al., Anorg. Allg. Chem. 393:241–252 (1972)). The germanium analogs are well known ((a) Olivier-Fourcade, J., et al., Rev. Chim. Miner. 9:757–770 (1972); (b) Eisenmann, B., et al., Anorg. Allg. Chem., 516:49–54 (1984); (c) Pohl, S., et al., Naturforsch 28b:565 (1973); (d) Kreb, B., et al., Angew. Chem. Int. Ed. Engl. 9:897 (1970); (e) Kreb, B., et al., Naturforsch 26b:853–854 (1971); (f) Pohl, S., et al., Anorg. Allg. Chem. 424:265–272 (1976); (g) Philippot, E., et al., Rev. Chim. Miner. 8:477–489 (1971)) and have been found as building blocks in the structures of $KInGeS_4$, $KGaGeS_4^{3d}$ and $BaAg_2GeS_4$ (Teske, Chr., L. Z. Naturforsch 34b:544–547 (1979)). Mixed metal systems of divalent metals (Zn, Hg, Mn) and main group metals (Ge, Sn) have not been described.

U.S. Pat. No. 3,124,426 to Offergeld et al describes photo resistive indium compositions including chalcogenides.

U.S. Pat. No. 3,480,409 to Dillon et al describes crystalline $CdCr_2Se_4$ crystals which are ferromagnetic and thus are useful for magneto-optic modulation.

U.S. Pat. No. 3,696,038 to Davies et al describes $Ag_3AsS_3$ chalcogenide crystals as non-linear light transmission devices.

U.S. Pat. No. 3,688,109 to Gamble describes the use of heavy metal chalcogenides as X-ray gratings. The Bragg's law d-spacing is between 6 and 24 Å.

U.S. Pat. No. 3,803,044 to Carnall et al describe polycrystalline chalcogenide compounds which are magneto-optical of the formula $ACr_2X_4$ where X is a chalcogen anion (S, Te, Se) and A is a Group IA to IVA and IB to VIIIB element.

U.S. Pat. No. 4,258,109 to Liang et al describes chalcogenide compounds used as cathodes.

U.S. Pat. No. 4,366,141 to Martin et al describes the preparation of chalcogenides which are polycrystalline and have improved transmission in the visible and infrared light regions.

U.S. Pat. No. 4,730,896 to Katsuyama et al describes ternary chalcogenide glass (amorphous non-crystalline) compounds of Ge—Se—Te which are capable of transmitting infra-red rays of 2 µm or larger.

U.S. Pat. No. 4,751,022 to Sugio et al describes chalcogenide compounds which are oxy acid salts which are used for humidity sensing.

U.S. Pat. No. 4,789,500 to Morimoto et al describes magneto-optical $Cd_{1-x}Mn_xTe$ where X is $0.01 \leq x \leq 0.99$.

Kanatzidis, M. G., Chem. of Materials 2 353–363 (1990) describes the preparation of various ternary chalcogenide polychalcogenide compounds using a molten salt method at 200°–450° C.

Liao et al, Inorganic Chem 32 2453–2462 (1993) describe the use of the molten salt technique to prepare various ternary polychalcogenides.

Voevodina, O. V., et al Zhurnal Neorganicheskoi Khimii 37, 2776–2779 (1992) describe the preparation of ternary chalcogenides using the molten salt method.

Haeuseler et al, Z. Naturforsch, 44b:1035–1036 (1989) describe quaternary chalcogenides of the type $Ag_2HgMX_4$. There is no description in this reference of alkali metal quaternary chalcogenides.

OBJECTS

It is therefore an object of the present invention to provide novel alkali metal chalcogenide compounds which have non-linear optical properties. Further, it is an object of the present invention to provide a fused salt method for producing such compounds. These and other objects will become increasingly apparent by reference to the following description and the drawings.

IN THE DRAWINGS

Figure 5:
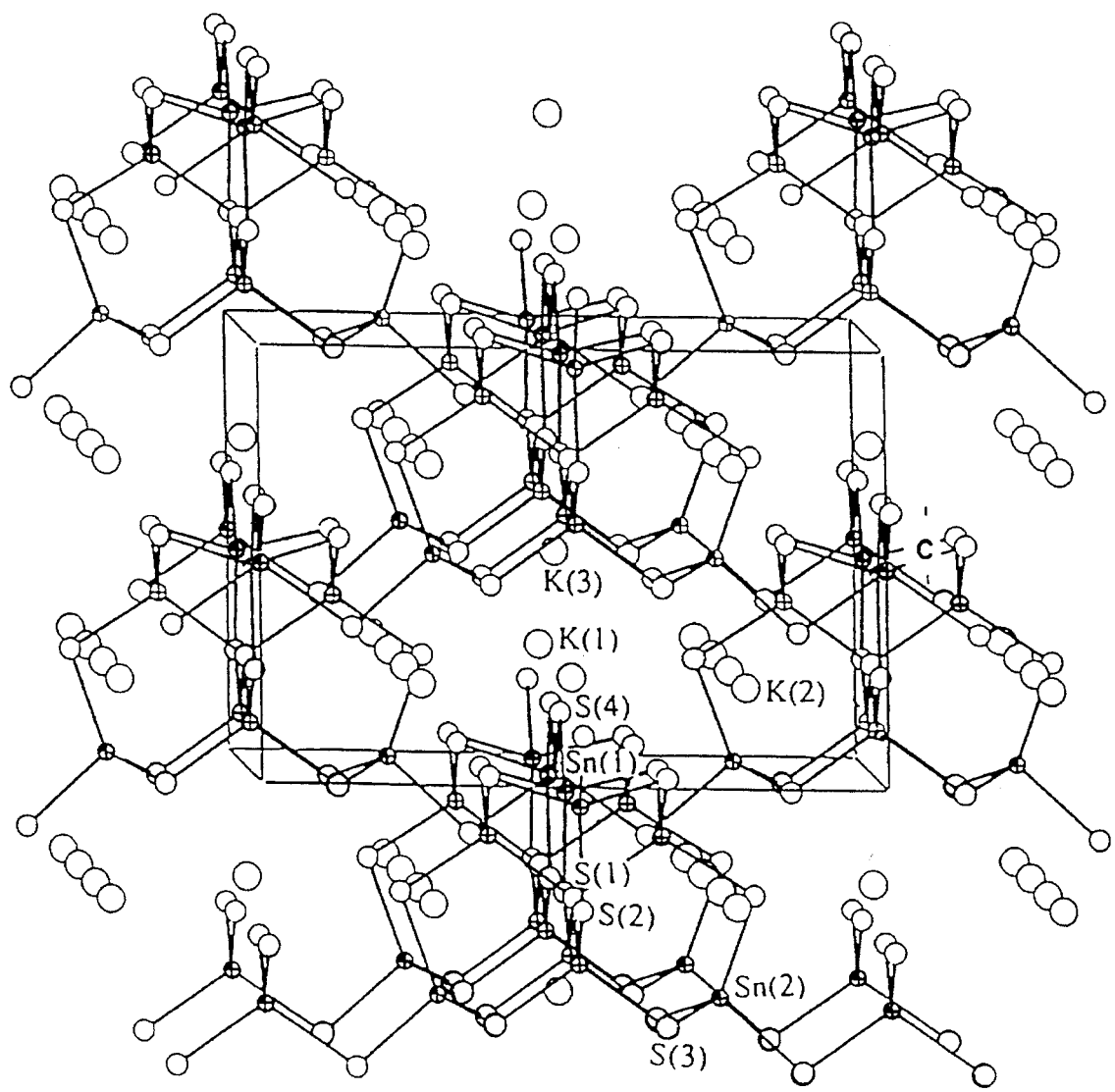

FIG. 5 is an ORTEP representation and labeling scheme of $K_6Zn_4Sn_5S_{17}$ viewed down the a- or b-axis. This view shows the polar character of the structure. K(1) cations are located inside the wide and narrow tunnels parallel to a- or b-axis.

Figure 6:
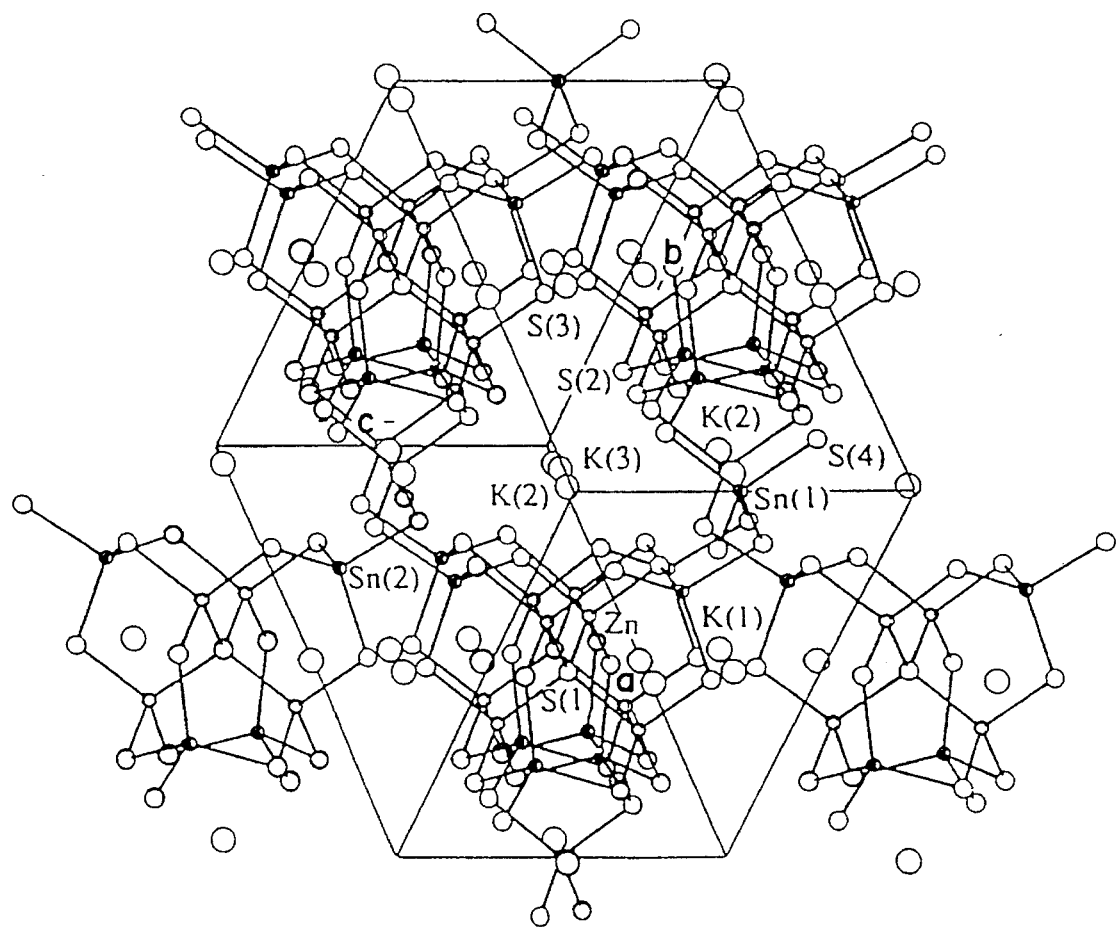

FIG. 6 is an ORTEP representation and labeling scheme of $K_6Zn_4Sn_5S_{17}$ viewed down the <110> or <1$\bar{1}$0> direction. K(2) and K(3) are located inside the tunnels.

Figure 7A:
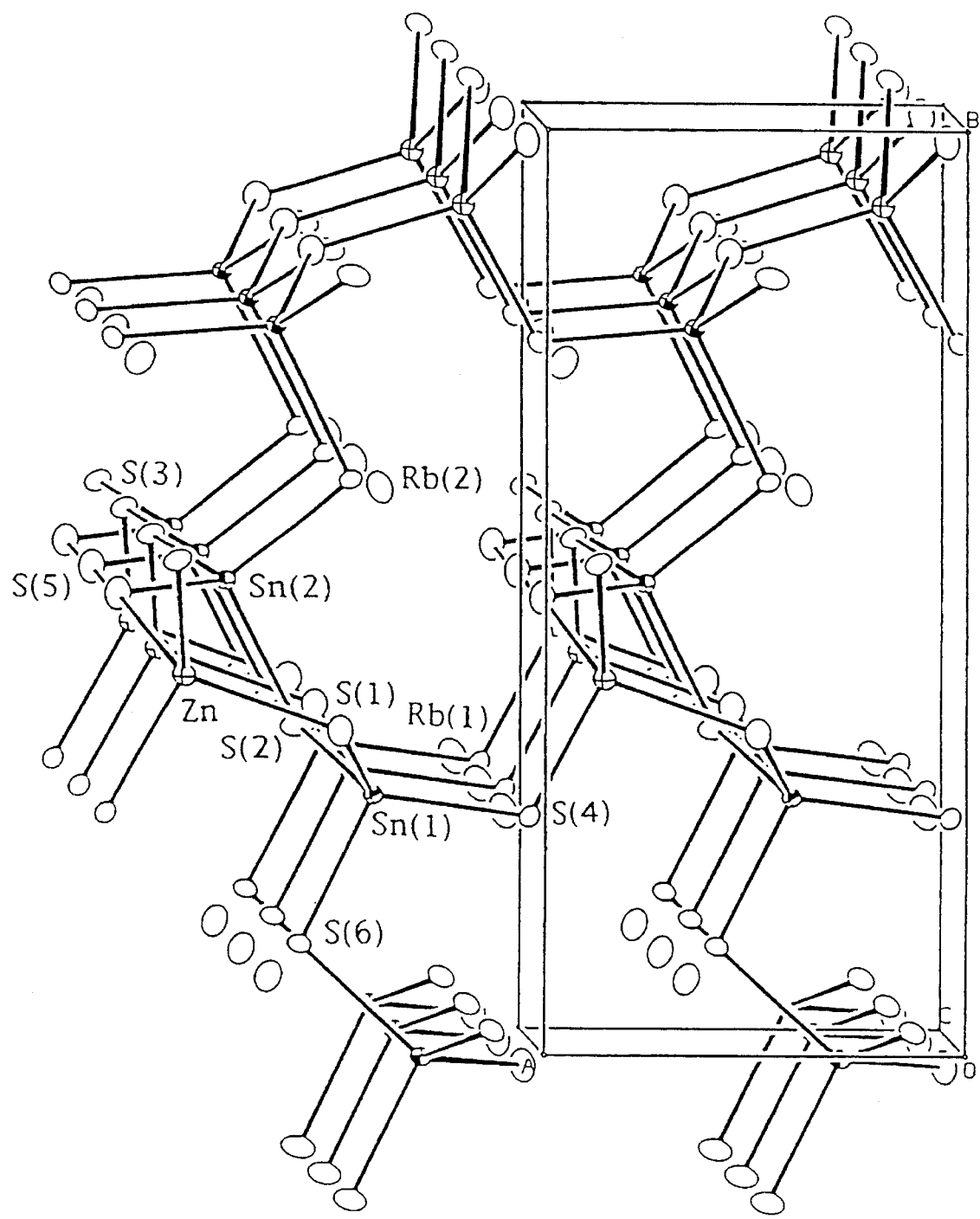
Figure 7B:
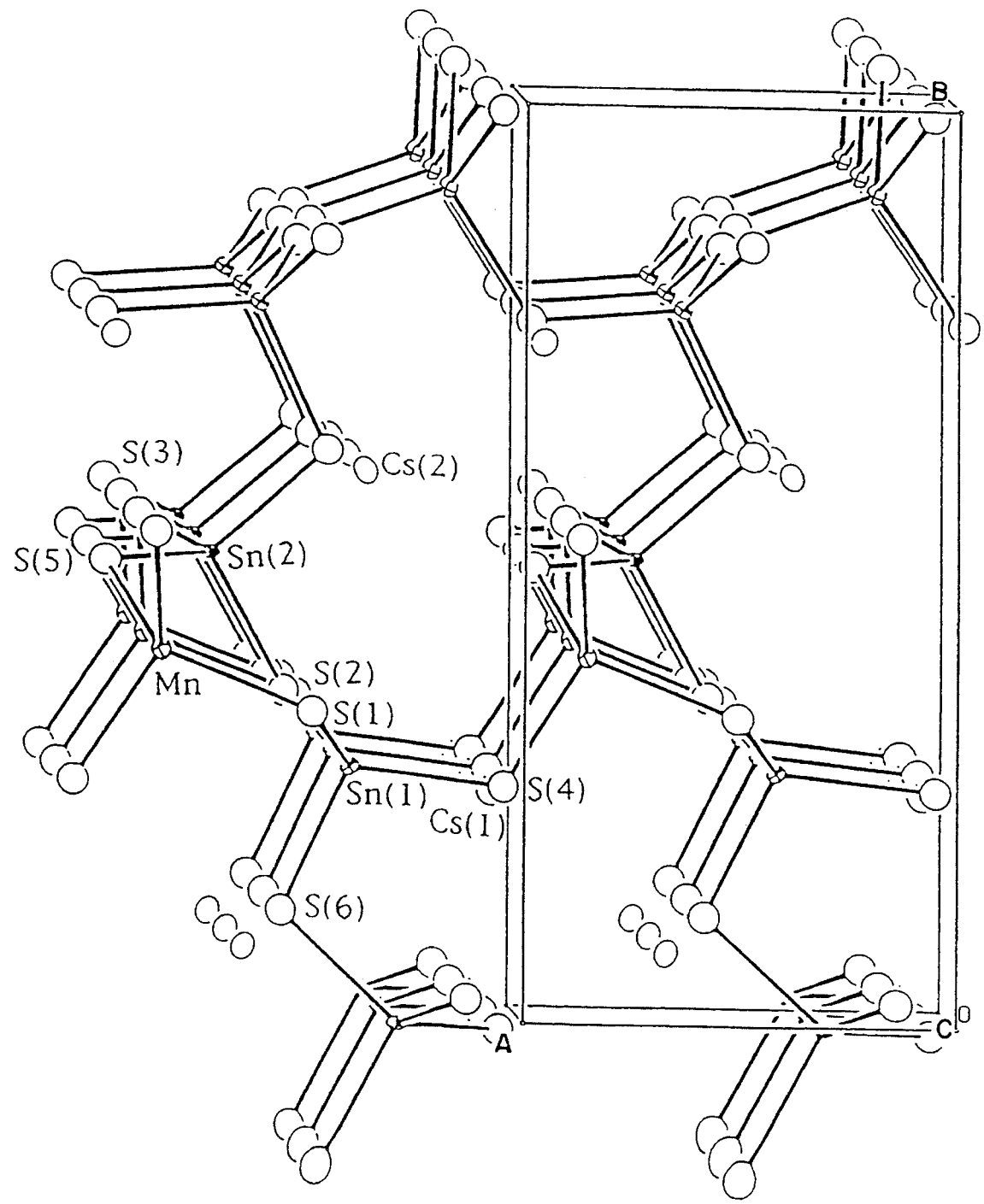

FIG. 7A is an ORTEP representation and labeling scheme of (A) $Rb_2ZnSn_2S_6$ and FIG. 7B is the ORTEP representation of $Cs_2MnSn_2S_6$.

Figure 8:
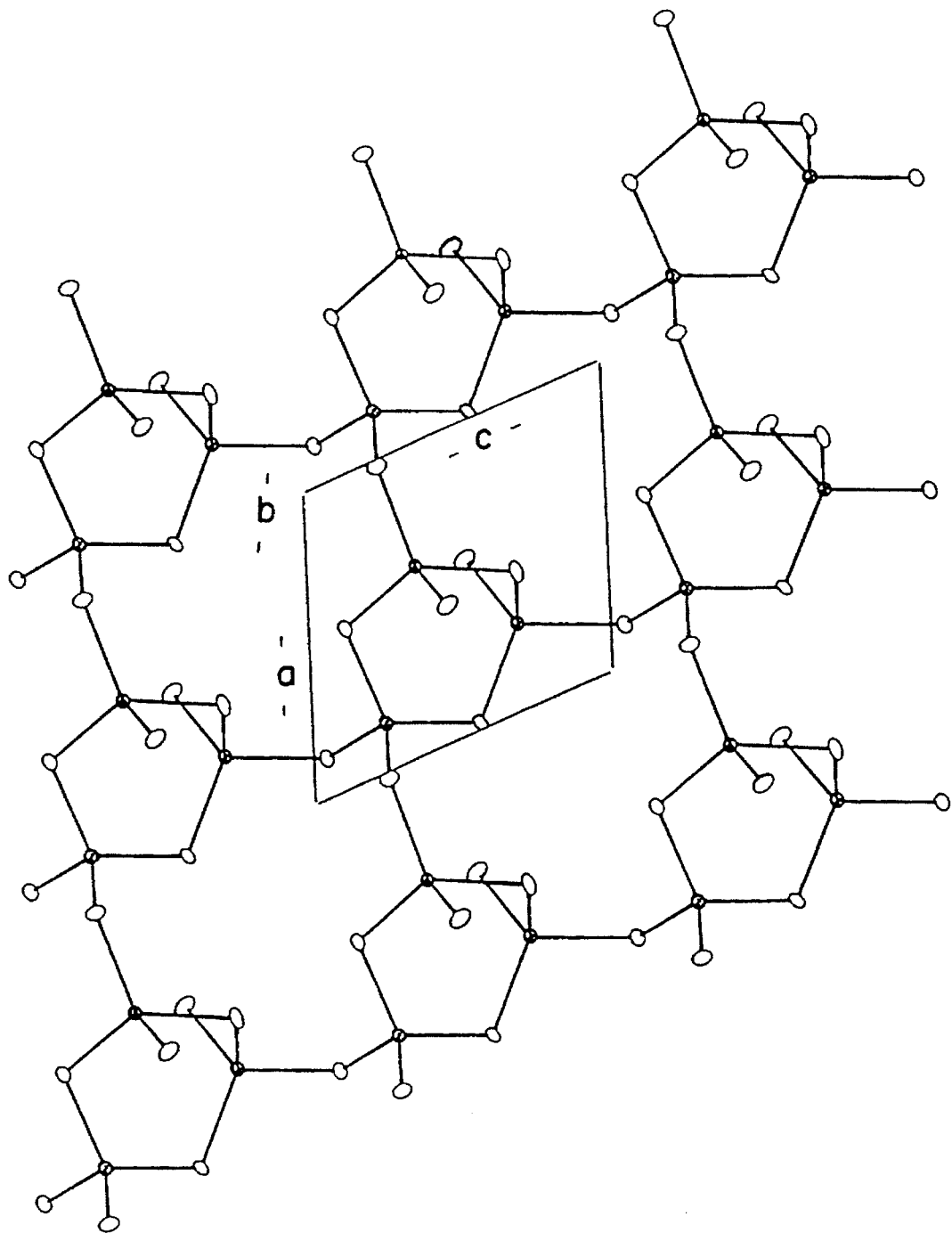

FIG. 8 is a representation of a single layer of the $(MSn_2S_6)^{2-}$ (M=Zn or Mn) framework viewed down the b-axis where adjacent layers above and below are related according to $P2_1$ symmetry.

Figure 9A:
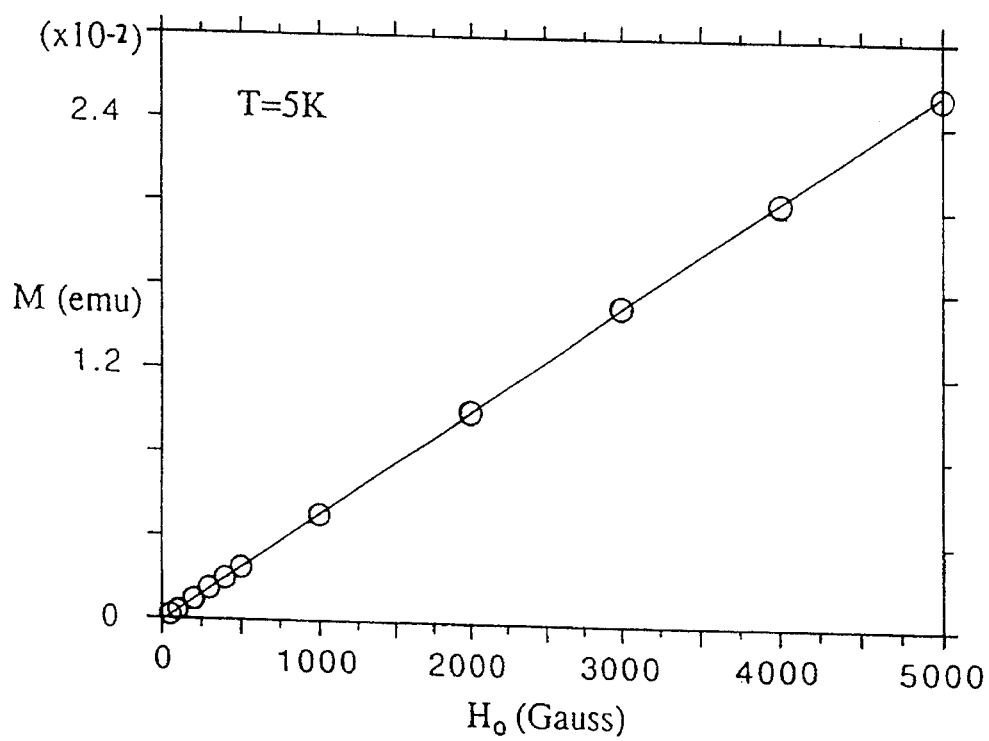
Figure 9B:
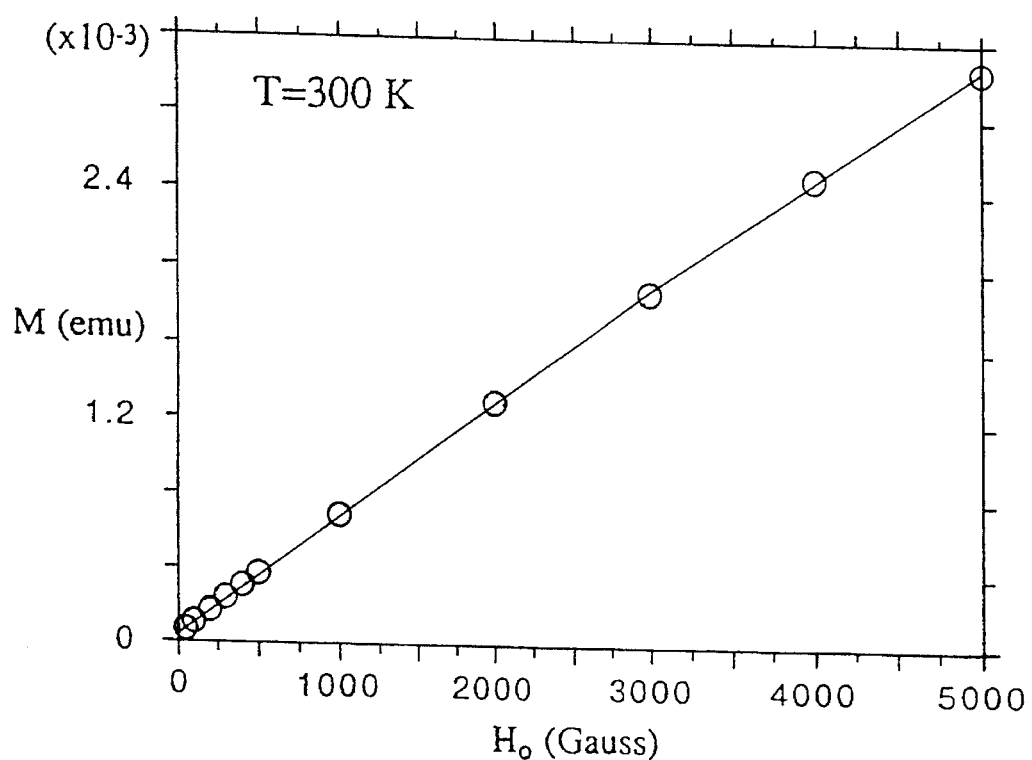

FIGS. 9A and 9B are graphs showing the relationships of magnetization vs. applied magnetic field. for $Cs_2MnSn_2S_6$ at 5° K. (FIG. 9A) and 300° K. (FIG. 9B).

Figure 10A:
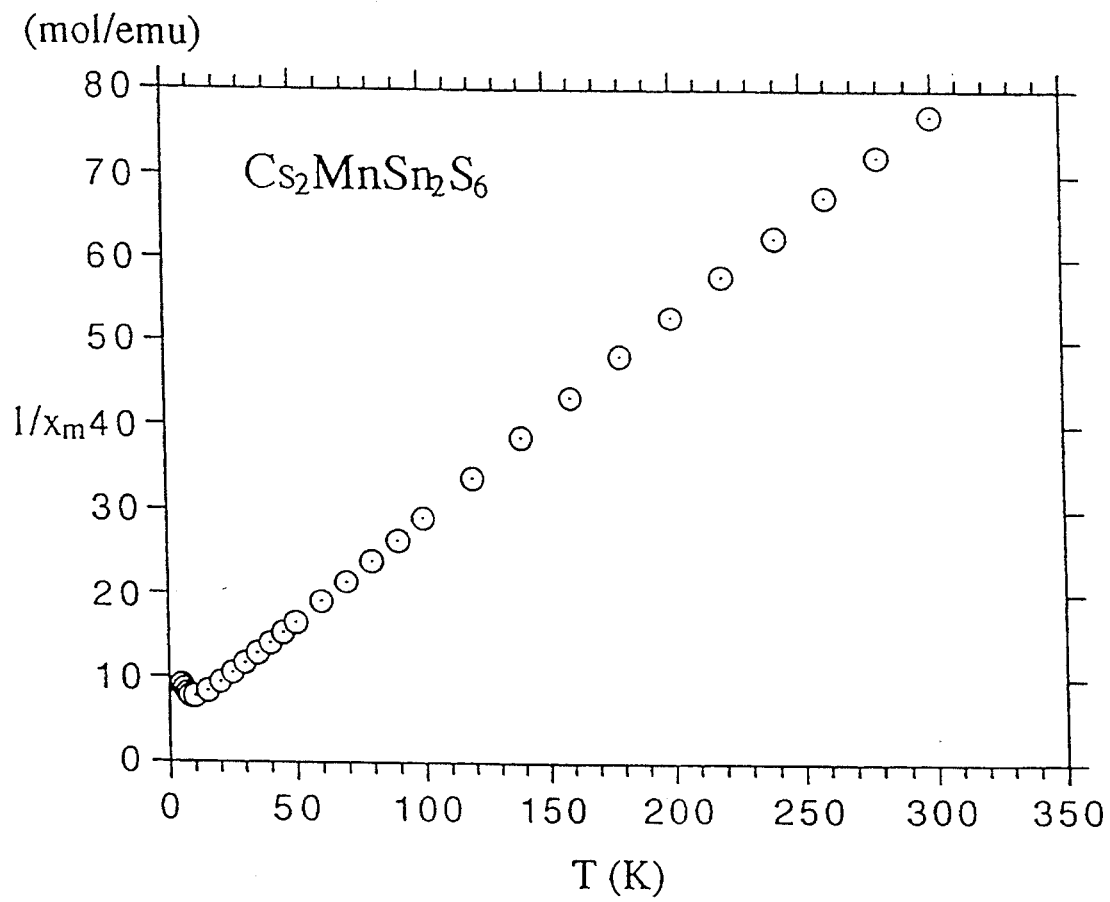
Figure 10B:
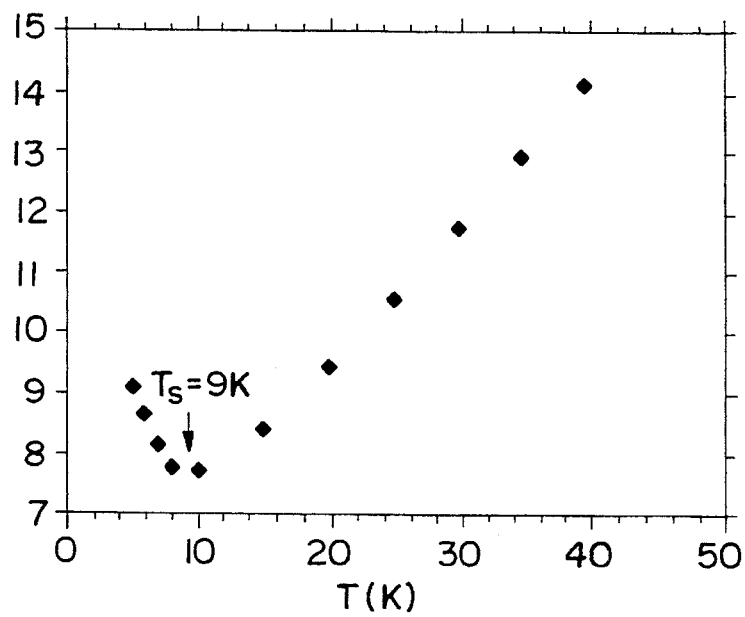

FIGS. 10A and 10B are graphs showing the relationship of $1/\chi_m$ vs. T which shows paramagnetism of $Cs_2MnSn_2S_6$ above $T_N$=9° K.

Figure 11A:
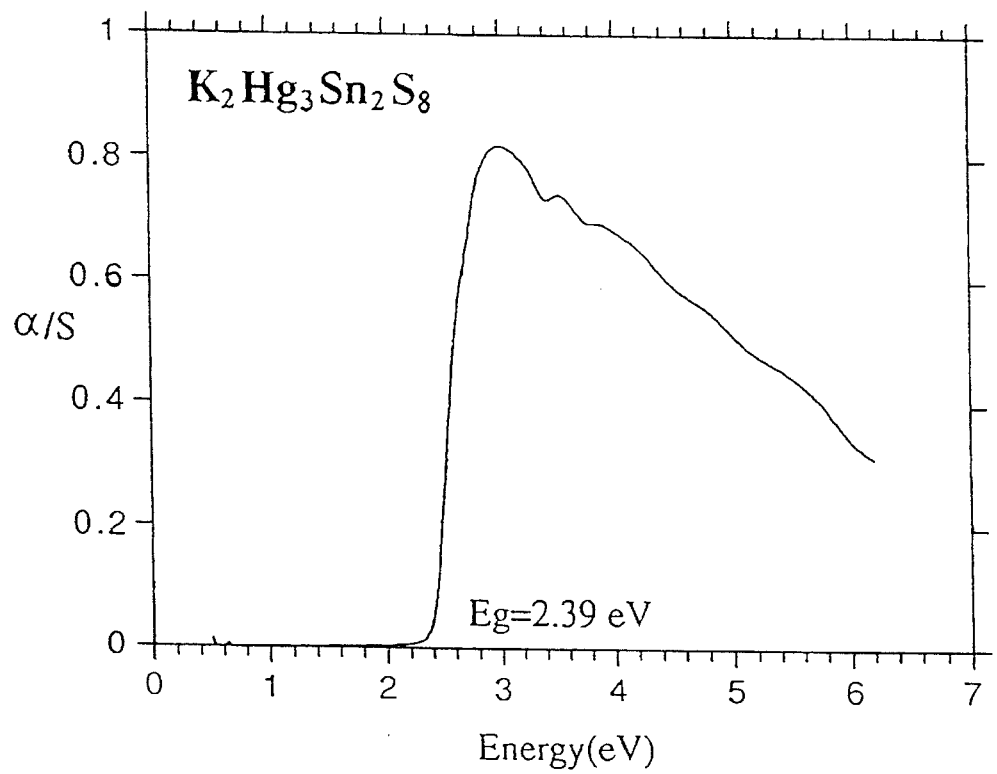
Figure 11B:
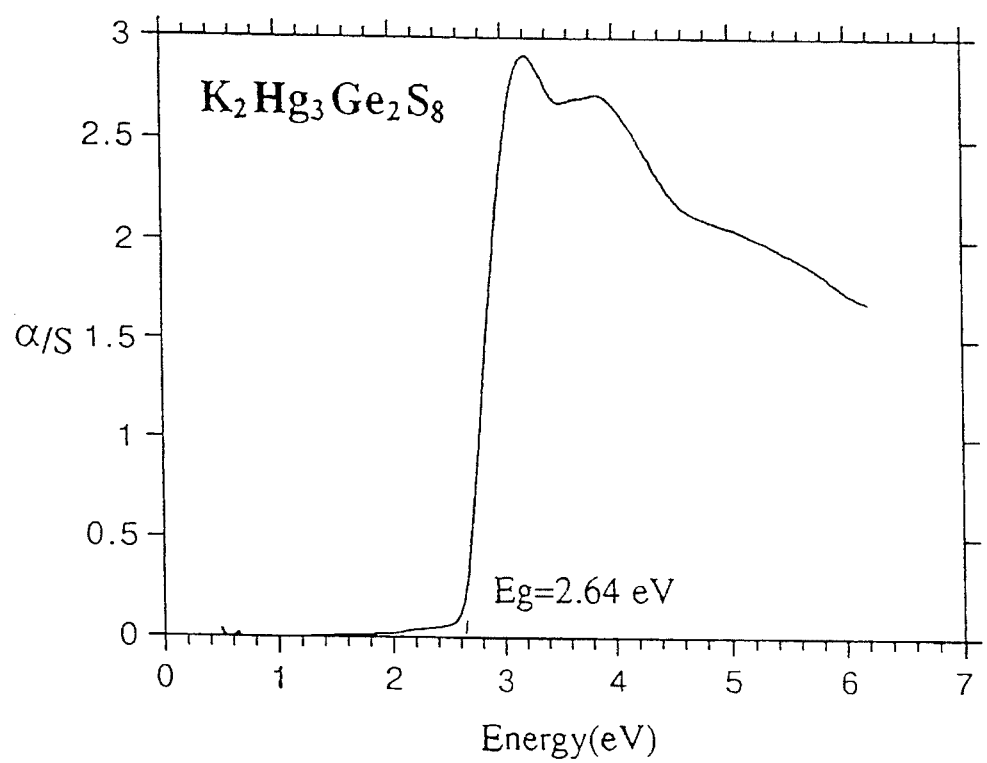
Figure 11D:
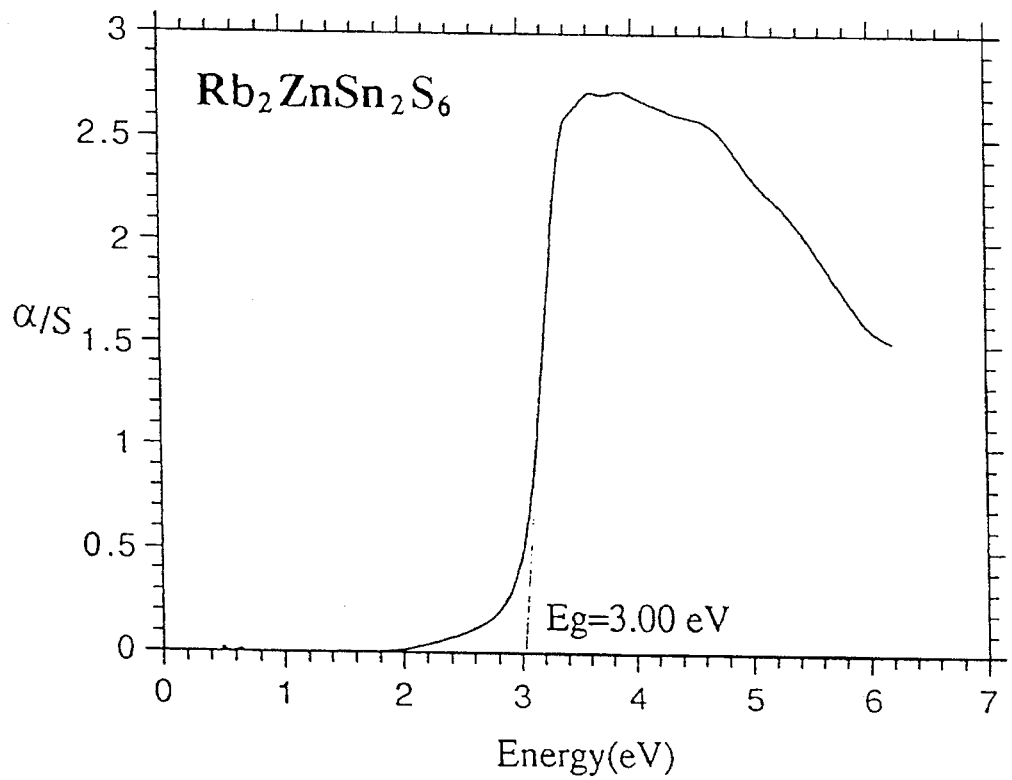
Figure 11E:
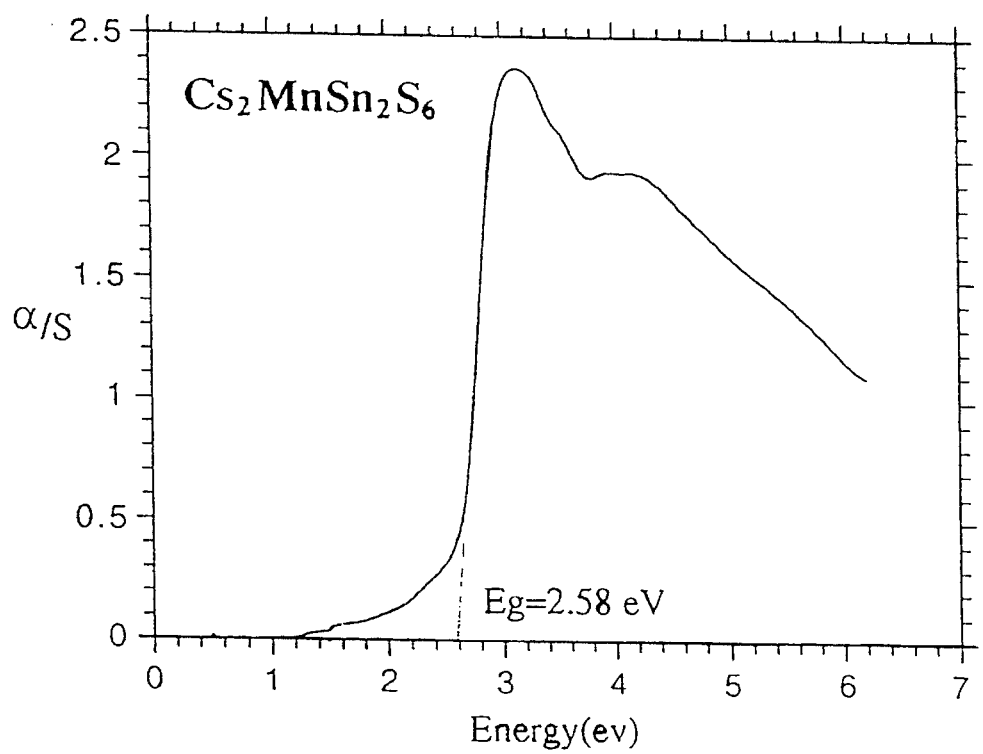

FIGS. 11A to 11E are optical absorption spectra of $K_2Hg_3Sn_2S_8$ (FIG. 11A), $K_2Hg_3Ge_2S_8$ (FIG. 11B), $K_6Zn_4Sn_5S_{17}$ (FIG. 11C), $Rb_2ZnSn_2S_6$ (FIG. 11D), $Cs_2MnSn_2S_6$ (FIG. 11E).

Figure 12A:
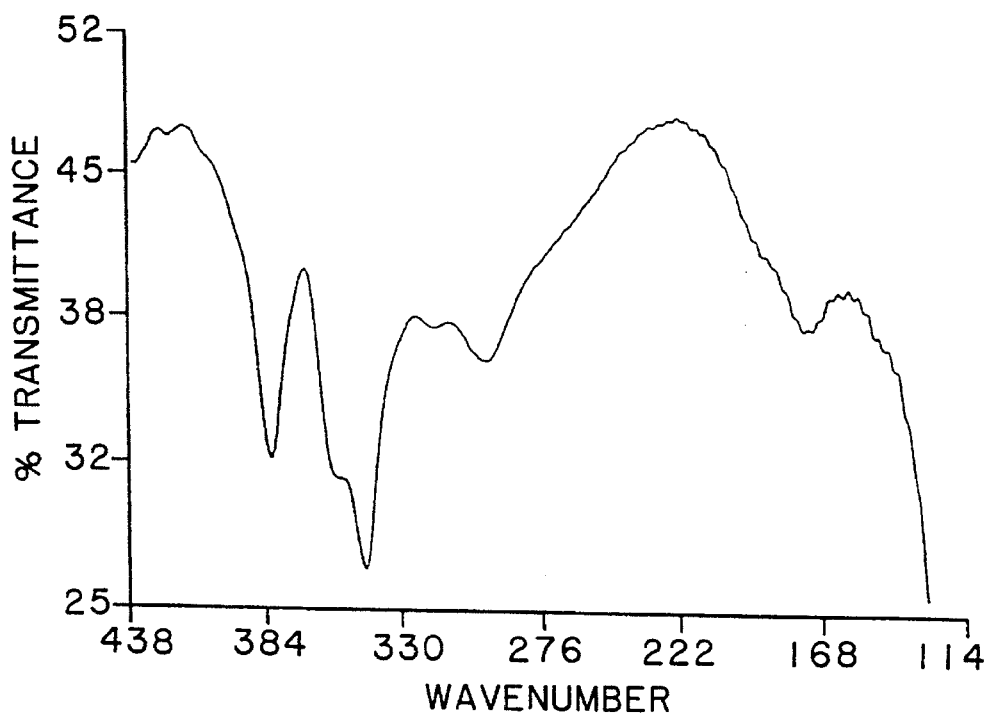
Figure 12B:
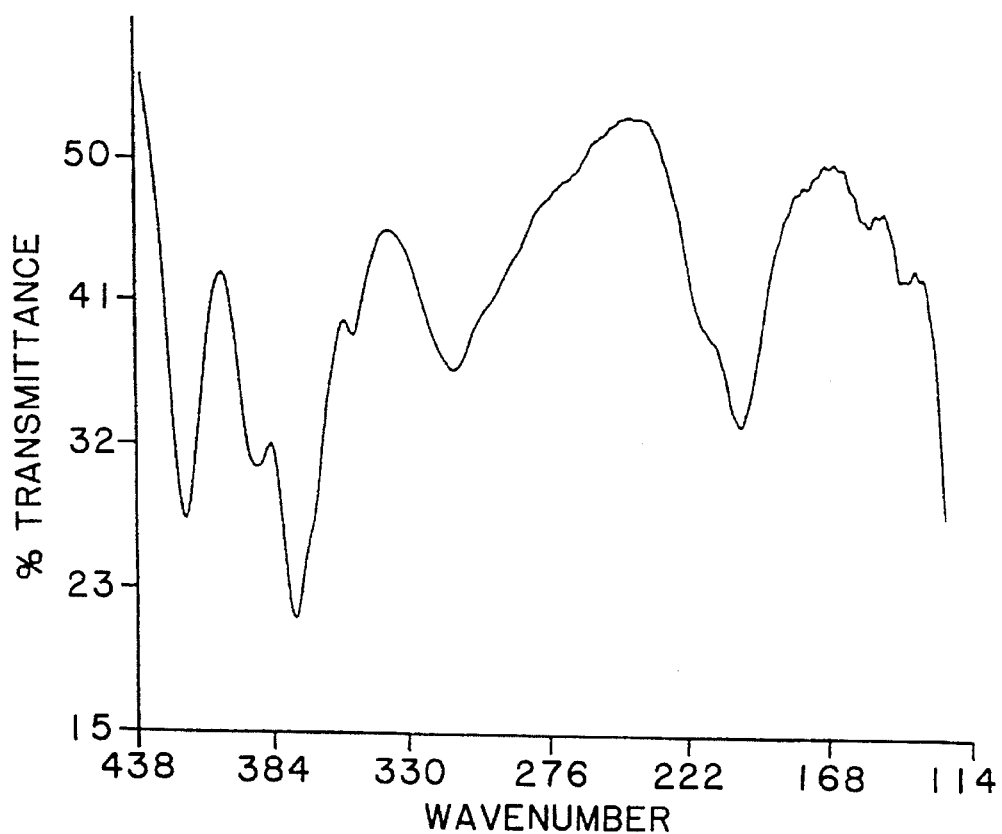
Figure 12C:
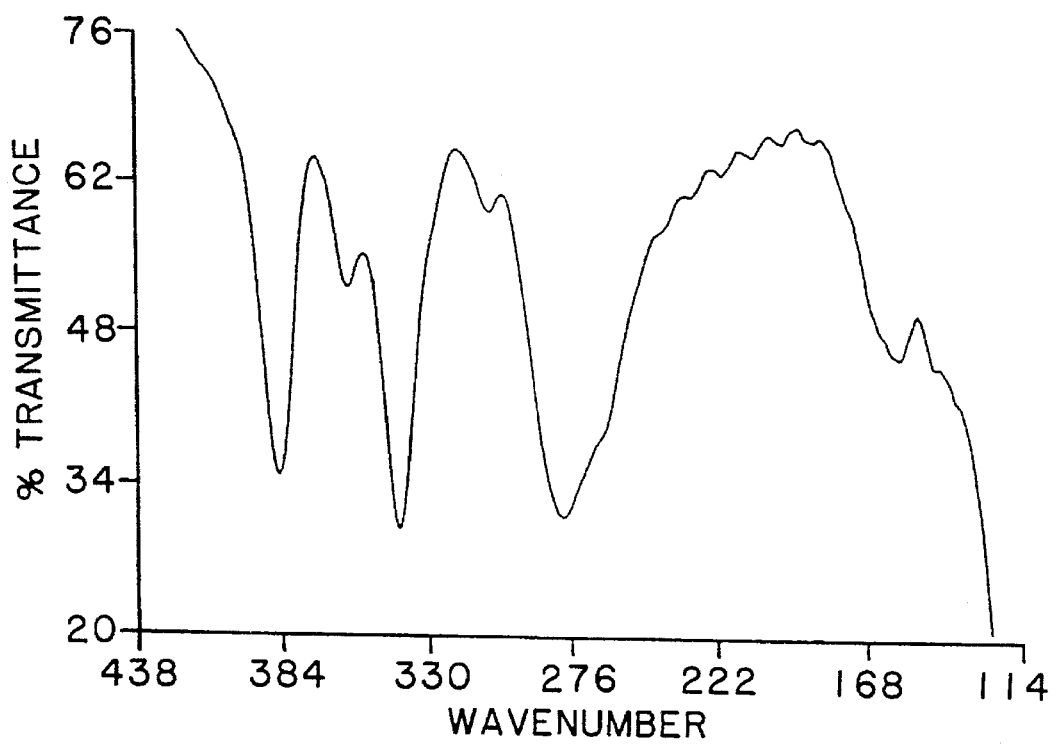
Figure 12D:
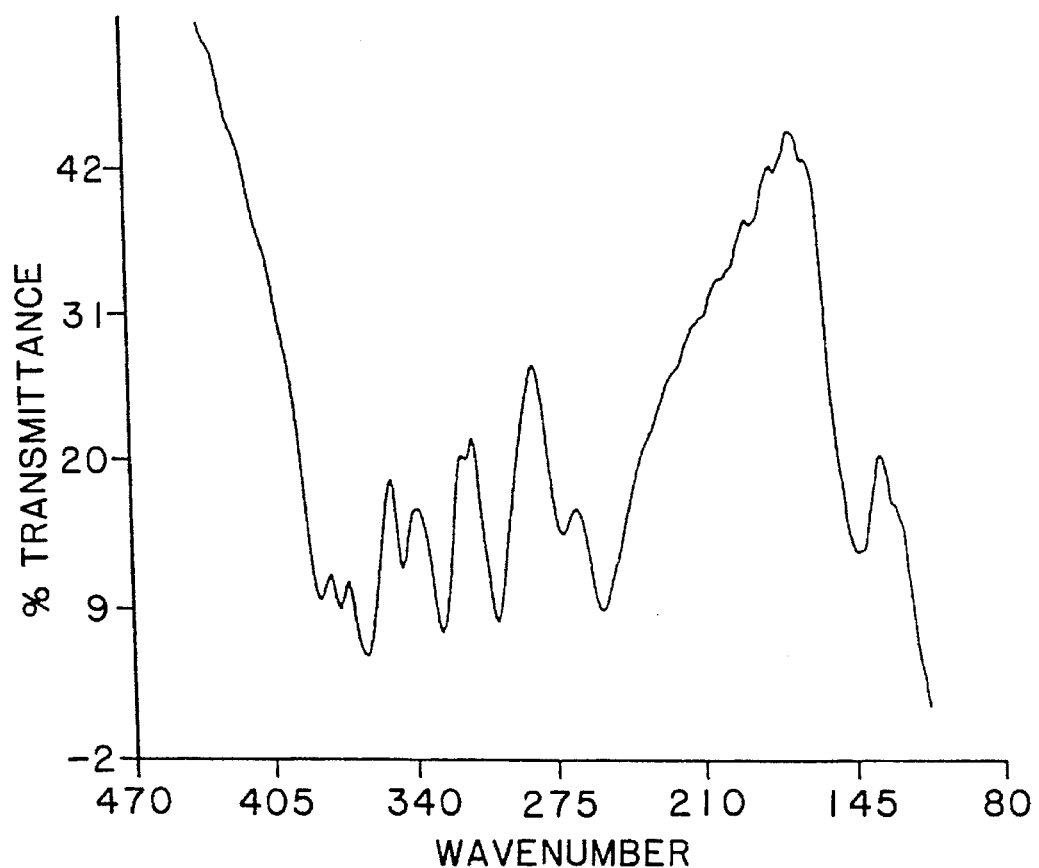
Figure 12E:
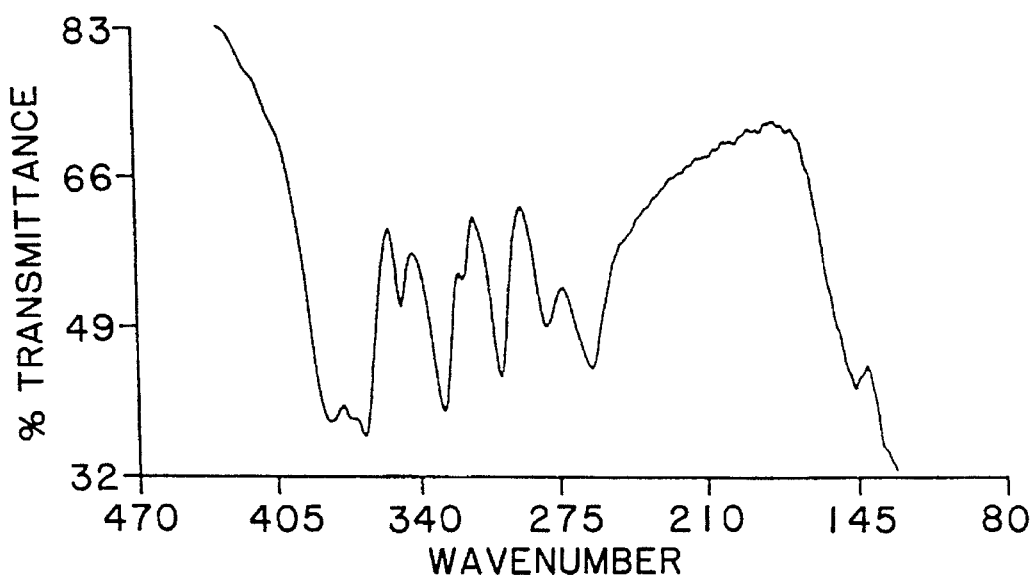

FIGS. 12A to 12E are infrared spectra of $K_2Hg_3Sn_2S_8$ (FIG. 12A), $K_2Hg_3Ge_2S_8$ (FIG. 12B), $K_6Zn_4Sn_5S_{17}$ (FIG. 12C), $Rb_2ZnSn_2S_6$ (FIG. 12D), $Cs_2MnSn_2S_6$ (FIG. 12E).

Figure 13:
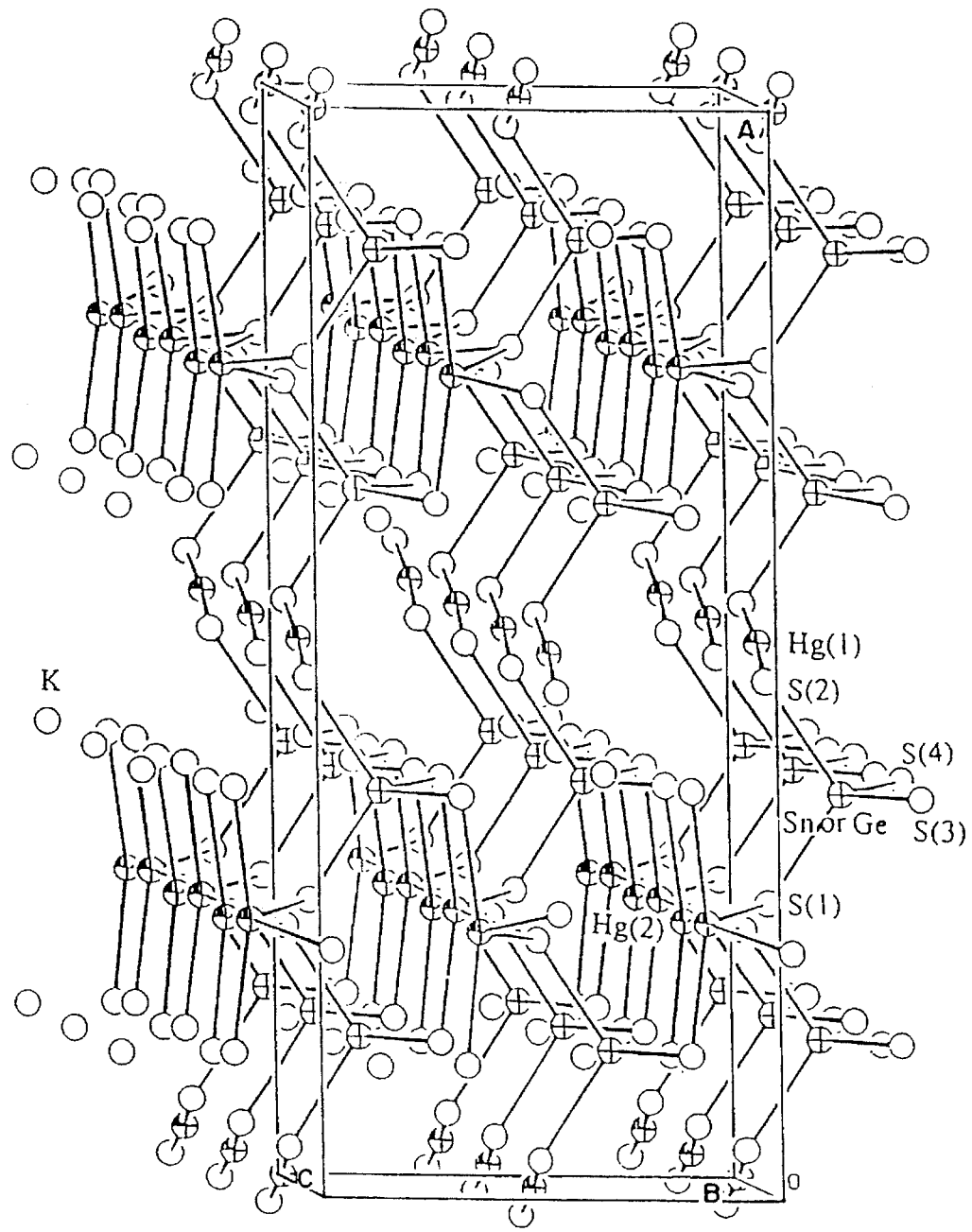
Figure 14:
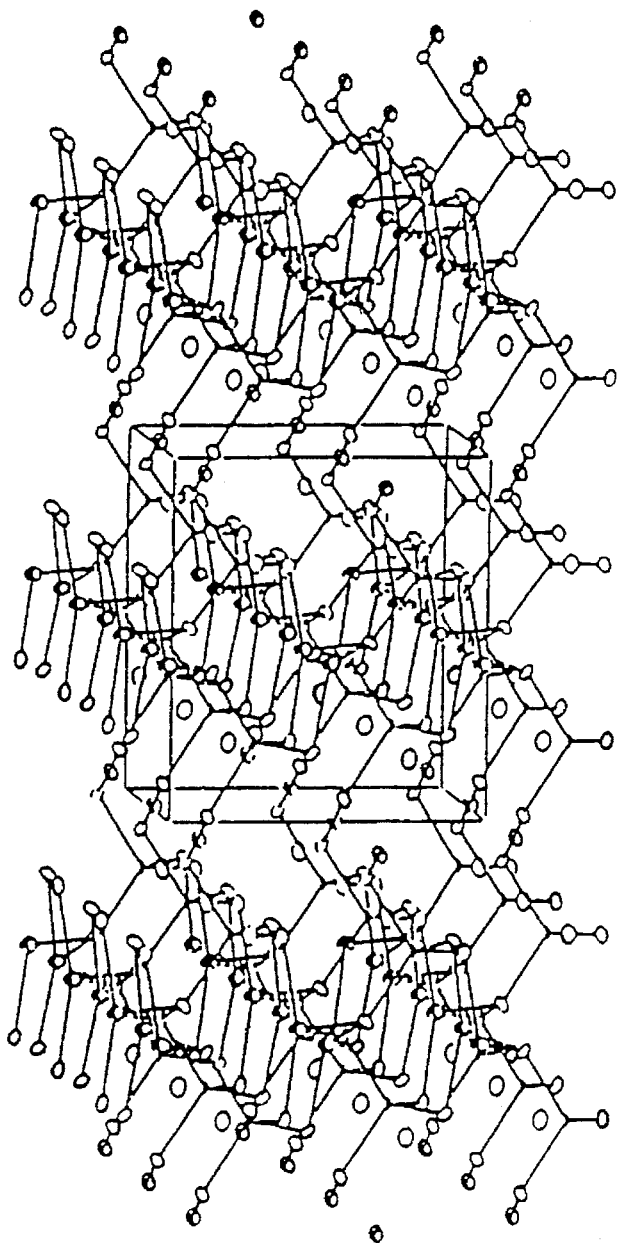

FIGS. 13 and 14 are side by side ORTEP representations of $K_2Hg_3Ge_2S_8$ and $(KRb)Hg_3Ge_2S_8$.

GENERAL DESCRIPTION

The present invention relates to a crystalline alkali metal quaternary chalcogenide of the formula $A_xB_yC_zD_n$ containing $(CD_4)^{4-}$ or $(C_2D_6)^{4-}$ ions where A is selected from the group consisting of an alkali metal and a mixture of alkali metals, B is selected from the group consisting of mercury, zinc and manganese, C is a metal selected from the group consisting of germanium and tin and D is selected from the group consisting of sulfur and selenium, wherein x, y, z and n are molar amounts which provide non-linear optical transmission properties.

The present invention also relates to a chalcogenide compound having the empirical formula:

$$A_xB_yC_zD_n$$

wherein A is selected from the group consisting of an alkali metal and a mixture of alkali metals, B is selected from the group consisting of mercury, zinc and manganese, C is a metal selected from the group consisting of germanium and tin and D is selected from the group consisting of sulfur and selenium, and wherein x is a number selected from the group consisting of 2 and 6, y is a number selected from the group consisting of 1, 3 and 4, z is a number selected from the group consisting of 2 and 5 and n is a number selected from the group consisting of 6, 8 and 17.

Further the present invention relates to a process for preparing a chalcogenide compound having the empirical formula $$A_xB_yC_zD_n$$

wherein A is selected from the group consisting of an alkali metal and a mixture of alkali metals, B is selected from the group consisting of mercury, zinc and manganese, C is a metal selected from the group consisting of germanium and tin and D is selected from the group consisting of sulfur and selenium, and wherein x is a number selected from the group consisting of 2 and 6, y is a number selected from the group consisting of 1, 3 and 4, z is a number selected from the group consisting of 2 and 5 and n is a number selected from the group consisting of 6, 8 and 17, which comprises reacting in a molten mixture ingredients selected from the group consisting of the B as an element, the C as an element, the A and the D together as an alkali metal sulfide and the B and the D together as a metal sulfide in molar amounts of the x, y, z or n and to produce the chalcogenide compound.

Further still, the present invention relates to a method including transmission of light through a crystal for analytical purposes, the improvement which comprises transmitting the light in a visible light and infrared light range between 0.4 and 20 μm through a crystal of a chalcogenide compound having the formula:

$$A_xB_yC_zD_n$$

wherein A is selected from the group consisting of an alkali metal and a mixture of alkali metals, B is selected from the group consisting of mercury, zinc and manganese, C is a metal selected from the group consisting of germanium and tin and D is selected from the group consisting of sulfur and selenium, and wherein x is a number selected from the group consisting of 2 and 6, y is a number selected from the group consisting of 1, 3 and 4, z is a number selected from the group consisting of 2 and 5 and n is a number selected from the group consisting of 6, 8 and 17, wherein the light into the crystal and the light out of the crystal change frequency.

Finally the present invention relates to an apparatus for converting a first light to a second light of another frequency using a chalcogenide compound to make the conversion, the improvement which comprises providing in the apparatus a chalcogenide compound of the formula $A_xB_yC_zD_n$ where A is selected from the group consisting of an alkali metal and a mixture of alkali metals, B is selected from the group consisting of mercury, zinc and manganese, C is a metal selected from the group consisting of germanium and tin and Dn is selected from the group consisting of sulfur and selenium, wherein x, y, z and n are molar amounts which provide non-linear optical transmission properties.

The following Examples 1 to 5 describe the preparation of the preferred chalcogenide compounds of the present invention. The reagents were:

Sn metal: −325 mesh, 99.8% purity; −325 mesh, 99.5% purity, Ge metal: −100 mesh, 99.99% purity; Mn metal: 99.9% purity, −50 mesh, Aldrich Chemical Company, Inc., Milwaukee, Wis. Sublimed sulfur: 99.5~100.5%; Zn powder: purified; HgS powder; J. T. Baker Inc., Phillipsburg, N.J. $A_2Q$ (A=K, Rb, Cs; Q=S, Se) starting materials were prepared as described elsewhere (Klemm, W., et al., Z. Anorg. Allg. Chem. 241:281–304 (1939)).

Physical Measurements

The instruments and experimental setups for Infrared spectroscopy, SEM/EDS quantitative microprobe analysis and UV/vis/near-IR optical diffuse spectroscopy are well known.

Magnetic susceptibility data were collected on a Quantum Design SQUID system, Michigan State University, East Lansing, Mich. 34.98-mg (0.0466 mmol) of $Cs_2MnSn_2S_6$ was loaded in a plastic bag and purged with Ar gas before measurement. The sample of this compound included a small amount MnS impurity (<1%) which did not significantly influence the results. The diamagnetic contribution of the plastic bag was relatively small and was ignored during data processing. Measurements of magnetization versus applied magnetic field were performed from 50 Gauss to 5000 Gauss at both 5° K. and 300° K. for $Cs_2MnSn_2S_6$. Various temperature magnetic susceptibility data were collected at a magnetic field of 5000 Gauss with an ascending temperature ramp from 5° K. to 300° K.

EXAMPLE 1

$K_2Hg_3Sn_2S_8$ (I) A mixture of Sn powder (0.030 g, 0.25 mmol), HgS powder (0.116 g, 0.499 mmol), $K_2S$ (0.055 g, 0.50 mmol) and S (0.128 g, 4.00 mmol) was heated at 400° C. for 4 days and was then cooled to room temperature at 4° C./hour. The product was washed with degassed dimethyl formamide (DMF) and was dried with acetone and ether. Yellow crystals of (I) and small amount of orange brown square planar crystals and red HgS crystals (less than 5%) were obtained. The yield of yellow crystals was 0.101 g (69%, based on Sn). The yellow crystals are insoluble in water and common organic solvents. SEM/EDS semiquantitative elemental analyses indicated $K_{1.0}Sn_{1.0}Hg_{1.9}S_{6.7}$.

EXAMPLE 2

$K_2Hg_3Ge_2S_8$ (II) The reaction of Ge (0.018 g, 0.25 mmol), HgS (0.087 g, 0.38 mmol), $K_2S$ (0.055 g, 0.50 mmol) and S (0.128 g, 4.00 mmol) at 400° C. for 4 days upon a cooling rate of 4° C./hour afforded yellow crystals of (II) and very small amount of HgS crystals. The yield of (II) was 0.083 g (64%, based on Ge). The product is stable in air and insoluble in water and common organic solvents. SEM/EDS indicated $K_{0.76}Hg_{1.0}Ge_{0.29}S_{4.97}$.

EXAMPLE 3

$K_6Zn_4Sn_5S_{17}$ (III) The reaction of Sn (0.059 g, 0.5 mmol), Zn (0.033 g, 0.5 mmol), $K_2S$ (0.110 g, 1.0 mmol) and S (0.256 g, 8.0 mmol) at 400° C. for 4 days upon a cooling rate of 4° C./hour afforded 0.068 g yellowish white crystals in ~33% yield (based on Sn). The product was washed with degassed DMF and was dried with acetone and ether. The yield can be increased by adding more Sn metal in the reactions. The ratio of 6/5:4/5:2:16 ($Sn:Zn:K_2S:S$) under the same reaction condition gave a yield of ~80%. However, this reaction also gave a small amount of yellowish orange crystals of $K_2Sn_2S_5$ and reddish orange crystals of $K_2Sn_2S_8$ as by-products. The yellowish white crystals of (III) are stable in air and insoluble in water and common organic solvents. SEM/EDS semiquantitative elemental analysis indicated $K_{2.3}Zn_{1.0}Sn_{1.75}S_{7.38}$.

EXAMPLE 4

$Rb_2ZnSn_2S_6$ (IV) The reaction of Sn (0.119 g, 1.00 mmol), Zn (0.033 g, 0.50 mmol), $Rb_2S$ (0.406 g, 1.00 mmol) and S (0.512 g, 8.00 mmol) at 400° C. for 4 days upon a cooling rate of 4° C./hour afforded 0.131-g brownish orange crystals of (IV) in ~40% yield (based on Sn). The product was washed with degassed DMF, was dried with acetone and ether. The brownish white crystals are insoluble in water and common organic solvents. SEM/EDS semiquantitative elemental analysis indicated $Rb_{1.1}Zn_{1.0}Sn_{1.9}S_{6.0}$.

EXAMPLE 5

$Cs_2MnSn_2S_6$ (V) The reaction of Sn powder (0.072 g, 0.61 mmol), Mn powder (0.016 g, 0.29 mmol), $Cs_2S$ (0.358 g, 1.20 mmol) and S (0.154 g, 4.81 mmol) at 400° C. for 4 days upon a cooling rate of 4° C./hour gave 0.083-g brownish white crystals of (V) and very small amount of MnS powder. The yield of (V) is ~38% yield (based on Sn). The product was washed with degassed DMF, was dried with acetone and ether. The brownish white crystals are insoluble in water and common organic solvents. SEM/EDS semiquantitative elemental analysis indicated $Cs_{2.6}Mn_{1.0}Sn_{2.8}S_{10.2}$.

In Examples 1 to 5, x-ray powder diffraction patterns were used for the purpose of phase characterization and identification. The x-ray powder diffraction patterns were recorded with a Phillips XRD-3000 controlled by PDP 11 computer and operating at 40 kV/35 mA. Ni-filtered Cu radiation was used. In order to ensure the homogeneity, d-spacings obtained from x-ray powder diffraction (XRD) measurements of the products were compared with, and found to be identical, with those calculated from using the atomic coordinates determined from the single crystal data. The calculation of d-spacings was performed using the POWD $10^8$ program.

The single crystal x-ray diffraction data of chalcogenide compounds (II), (III) and (IV) were collected on a Rigaku AFC6S four-circle diffractometer while the data for (I) and (V) were collected on a Niclolet P3 diffractometer. Graphite monochromated Mo Kα radiation was used. All the crystals were mounted at the end of glass fibers. The stability of the experimental setup and crystal integrity were monitored by measuring three standard reflections periodically every 150 reflections for all the data set except for (I) which was monitored every 300 reflections. No significant decay was observed during the data collections. The structures were solved with direct methods (SHELXS-86)[9], and were refined by a full-matrix least-square technique available in the TEXSAN[10] programs running on a VAXstation 3100/76 computer. An empirical absorption correction was applied to all the data (based on ψ scans). An additional absorption correction following the DIFABS[11] procedure was applied to isotropically refined data. Since chalcogenide compounds (I)~(V) crystallize in acentric space groups, their enantiomorphs were checked. The refinement of the enantiomorphous models of all compounds did not show significant improvement while the R/Rw values for chalcogenides (I)~(IV) dropped from 5.1/5.1 to 3.9/4.2, from 4.9/6.6 to 4.3/5.9, from 4.3/5.4 to 3.6/4.6 and from 3.6/4.7 to 2.7/3.4, respectively. The models with lower R/Rw values and smaller standard deviation of bond distances and angles are reported.

The crystallographic data and detailed information of structure solution and refinement are listed in Table 1. Atomic coordinates and equivalent isotropic thermal parameters are given in Tables 2–6, respectively.

TABLE 1

Summary of Crystallographic Data for $K_2Hg_3Sn_2S_8$(I), $K_2Hg_3Ge_2S_8$(II), $K_6Zn_4Sn_5S_{17}$(III), $Rb_2ZnSn_2S_6$(IV), $Cs_2MnSn_2S_6$(V).

|  | (I) | (II) | (III) | (IV) | (V) |
|---|---|---|---|---|---|
| formula | $K_2Hg_3Sn_2S_8$ | $K_2Hg_3Ge_2S_8$ | $K_6Zn_4Sn_5S_{17}$ | $Rb_2ZnSn_2S_6$ | $Cs_2MnSn_2S_6$ |
| fw | 1173.83 | 1081.63 | 1634.58 | 666.06 | 750.49 |
| a, Å | 19.522(5) | 19.188(3) | 13.796(2) | 6.873(2) | 7.098(1) |
| b, Å | 9.835(3) | 9.618(2) | 13.796(2) | 13.456(4) | 13.729(3) |
| c, Å | 8.431(2) | 8.328(5) | 9.580(2) | 7.285(2) | 7.434(1) |
| α | 90.0 | 90.0 | 90.0 | 90.0 | 90.0 |
| β | 90.0 | 90.0 | 90.0 | 113.12(2) | 112.57(1) |
| γ | 90.0 | 90.0 | 90.0 | 90.0 | 90.0 |
| Z, V, Å$^3$ | 4, 1618.7(9) | 4, 1537(1) | 2, 1823.3(6) | 2, 619.7(3) | 2, 668.9(4) |
| space group | Aba2(#41) | Aba2(#41) | I4m2(#119) | P2$_1$(#4) | P2$_1$(#4) |
| d$_{calc}$, g/cm$^3$ | 4.816 | 4.674 | 2.977 | 3.569 | 3.726 |
| crystal size, (mm) | 0.23 × 0.30 × 0.31 | 0.16 × 0.30 × 0.50 | 0.26 × 0.44 × 0.52 | 0.42 × 0.40 × 0.14 | 0.43 × 0.42 × 0.15 |
| temp. (°C.) | 20 | 23 | 23 | −90 | −95 |
| radiation | Mo Kα | Mo Kα | Mo Kα | Mo Kα | Mo Kα |
| μ(Mo Kα), cm$^{-1}$ | 328.89 | 352.34 | 76.59 | 145.04 | 107.99 |
| scan mode | ω | ω–2θ | ω–2θ | ω–2θ | ω–2θ |
| scan speed, °/min | 2θ = 3–43° 4°/min 2θ = 43–55° 2°/min | 2 | 4 | 8 | 4 |
| 2θ$_{max}$, deg | 55 | 50 | 50.0 | 50.0 | 55.0 |
| no. of data collected | 1087 | 801 | 497 | 1247 | 1737 |
| no. of unique data | 999 | 795 | 497 | 1154 | 1619 |
| no. of observed data (I > 3.0σ(I)) | 882 | 632 | 456 | 1044 | 1560 |
| no. of variables | 69 | 69 | 46 | 100 | 100 |
| final R/R$_w$, % | 3.9/4.2 | 4.3/5.9 | 3.6/4.6 | 2.7/3.4 | 6.29/8.36 |

TABLE 2

Positional Parameters and Equivalent Isotropic Displacement Values (Å$^2$)$^a$ for $K_2Hg_3Sn_2S_8$ with Estimated Standard Deviations in Parentheses

| atom | x | y | z | B(eq) |
|---|---|---|---|---|
| Hg(1) | 0.5 | 1.0000 | 0.4894(2) | 1.06(4) |
| Hg(2) | 0.25473(5) | 0.5396(1) | 0.6491 | 1.47(3) |
| Sn | 0.36675(7) | 0.7856(2) | 0.3366(2) | 0.39(5) |
| K | 0.3835(3) | 0.7960(7) | 0.8424(9) | 1.7(2) |
| S(1) | 0.2674(2) | 0.7891(6) | 0.4952(9) | 1.1(2) |
| S(2) | 0.4697(3) | 0.7709(6) | 0.4967(9) | 0.9(2) |
| S(3) | 0.3751(3) | 0.4894(6) | 0.6835(8) | 0.9(2) |
| S(4) | 0.1330(2) | 0.5843(6) | 0.6806(7) | 0.6(2) |

TABLE 3

Positional Parameters and Equivalent Isotropic Displacement Values (Å$^2$)$^a$ for $K_2Hg_3Ge_2S_8$ with Estimated Standard Deviations in Parentheses

| atom | x | y | z | B(eq) |
|---|---|---|---|---|
| Hg(1) | 0.5 | 0 | 0.5251(5) | 1.51(8) |
| Hg(2) | 0.74494(8) | 0.4552(1) | 0.3587 | 1.95(6) |
| Ge | 0.6351(2) | 0.2110(4) | 0.6719(5) | 0.9(2) |
| K | 0.6125(5) | 0.198(1) | 0.161(1) | 2.2(4) |
| S(1) | 0.7298(5) | 0.2079(8) | 0.527(2) | 1.6(4) |
| S(2) | 0.5388(5) | 0.2330(8) | 0.520(2) | 1.6(4) |
| S(3) | 0.6234(5) | 0.518(1) | 0.314(2) | 1.2(4) |
| S(4) | 0.8681(4) | 0.4026(9) | 0.322(1) | 1.0(3) |

$^a$B(eq) = 4/3(a$^2$β11 + b$^2$β22 + c$^2$β33 + ab(cosγ)β12 + ac(cosβ)β13 + bc(cosα)β23).

TABLE 4

Positional Parameters and Equivalent Isotropic Displacement Values (Å$^2$)$^a$ for $K_6Zn_4Sn_5S_{17}$ with Estimated Standard Deviations in Parentheses

| atom | x | y | z | B(eq) |
|---|---|---|---|---|
| Sn(1) | 1/2 | 1/2 | 0 | 1.50(7) |
| Sn(2) | 0.7756(1) | 1/2 | −0.0260(1) | 1.53(6) |
| Zn | 1.0000 | 0.3611(2) | −0.1095(2) | 1.4(1) |
| K(1) | 1.0000 | 1/2 | 1/4 | 2.9(3) |
| K(2) | 0.7585(4) | 1.2585 | −1/4 | 3.8(2) |
| K(3) | 1/2 | 1/2 | 1/2 | 29(3) |
| S(1) | 1.0000 | 1/2 | −1/4 | 1.1(2) |
| S(2) | 0.7174(4) | 1/2 | −0.2589(6) | 2.3(2) |
| S(3) | 0.8628(2) | 0.3578(3) | 0.0326(4) | 1.9(1) |
| S(4) | 0.6428(4) | 1/2 | 0.1434(6) | 2.9(3) |

$^a$B(eq) = 4/3(a$^2$β11 + b$^2$β22 + c$^2$β33 + ab(cosγ)β12 + ac(cosβ)β13 + bc(cosα)β23).

TABLE 5

Positional Parameters and Equivalent Isotropic Displacement Values (Å$^2$)$^a$ for $Rb_2ZnSn_2S_6$ with Estimated Standard Deviations in Parentheses

| atom | x | y | z | B(eq) |
|---|---|---|---|---|
| Sn(1) | 0.3925(1) | 0.2663 | 0.3662(1) | 0.59(3) |
| Sn(2) | 0.2806(1) | −0.0123(1) | 0.3020(1) | 0.62(3) |
| Rb(1) | 0.0580(2) | 0.2402(1) | 0.7341(2) | 1.89(6) |
| Rb(2) | 0.6596(2) | 0.0824(1) | 0.0081(2) | 1.60(6) |
| Zn | 0.8413(2) | 0.3966(2) | 0.2470(2) | 0.79(6) |
| S(1) | 0.4872(5) | 0.3414(3) | 0.1226(5) | 1.1(1) |
| S(2) | 0.5523(6) | 0.3307(3) | 0.7017(5) | 1.2(1) |
| S(3) | 0.1305(5) | 0.0271(3) | −0.0431(5) | 0.9(1) |
| S(4) | 0.0233(5) | 0.2481(3) | 0.2507(6) | 1.1(1) |
| S(5) | 0.9758(5) | 0.4756(3) | 0.5606(5) | 1.3(1) |

TABLE 5-continued

Positional Parameters and Equivalent Isotropic Displacement Values ($Å^2$)$^a$ for $Rb_2ZnSn_2S_6$ with Estimated Standard Deviations in Parentheses

| atom | x | y | z | B(eq) |
|---|---|---|---|---|
| S(6) | 0.5611(6) | 0.1038(3) | 0.4693(6) | 1.2(1) |

TABLE 6

Positional Parameters and Equivalent Isotropic Displacement Values ($Å^2$)$^a$ for $Cs_2MnSn_2S_6$ with Estimated Standard Deviations in Parentheses.

| atom | x | y | z | B(eq) |
|---|---|---|---|---|
| Sn(1) | 0.3966(3) | 0.2663 | 0.3626(3) | 0.53(6) |
| Sn(2) | 0.2862(3) | −0.0082(2) | 0.3222(3) | 0.50(6) |
| Cs(1) | 0.0544(3) | 0.2358(2) | 0.7311(3) | 1.45(7) |
| Cs(2) | 0.6606(3) | 0.0778(2) | 0.0209(3) | 1.32(7) |
| Mn | 0.8412(7) | 0.3933(4) | 0.2286(7) | 0.7(1) |
| S(1) | 0.495(1) | 0.3300(7) | 0.118(1) | 1.2(3) |
| S(2) | 0.542(1) | 0.3419(6) | 0.681(1) | 1.2(3) |
| S(3) | 0.138(1) | 0.0257(6) | −0.015(1) | 1.0(2) |
| S(4) | 0.041(1) | 0.2498(6) | 0.249(1) | 1.0(3) |
| S(5) | 0.958(1) | 0.4841(7) | 0.537(1) | 1.2(3) |
| S(6) | 0.554(1) | 0.1088(6) | 0.481(1) | 1.0(2) |

$^a$B(eq) = $4/3(a^2\beta 11 + b^2\beta 22 + c^2\beta 33 + ab(\cos\gamma)\beta 12 + ac(\cos\beta)\beta 13 + bc(\cos\alpha)\beta 23)$.

Examples 1 to 5 show the feasibility of using molten salts as synthetic tools for the chalcogenide quaternary compounds of the present invention. This suggests molten salts provide good homogeneous reaction media for mixed metal systems. $(Sn_2S_6)^{4-}$ and $(SnS_4)^{4-}$, which can be isolated as separate anions from the $A_2S_x$ fluxes, are potentially good building blocks to construct quaternary structures. The chalcogenide compounds of Examples 1 to 5 also contain $(MS_4)^{4-}$ (M=Sn or Ge) linked by linear $HgS_2$ or tetrahedral MQ4 units (M=Hg, Zn, Mn; Q=S).

The formation of $K_2Hg_3Sn_2S_8$ (I) and $K_2Hg_3Ge_2S_8$ (II) is an example of the fact that Sn and Ge often undergo similar chemistry since they belong to the same group in the periodic table. Other examples are the formation of discrete anions such as $(MQ_4)^{4-}$, $(M_2Q_6)^{4-}$, and $(M_4Q_{10})^{4-}$,[5,6] where M=Ge, Sn; Q=S, Se. The radius of $Sn^{4+}$ is about 0.2 Å larger than that of $Ge^{4+}$. The three dimensional structures of (I) and (II) must be flexible enough to tolerate the large size difference of Ge and Sn.

Structures of $K_2Hg_3Sn_2S_8$ (I) and $K_2Hg_3Ge_2S_8$ (II)
(Examples 1 and 2)

Figure 1:
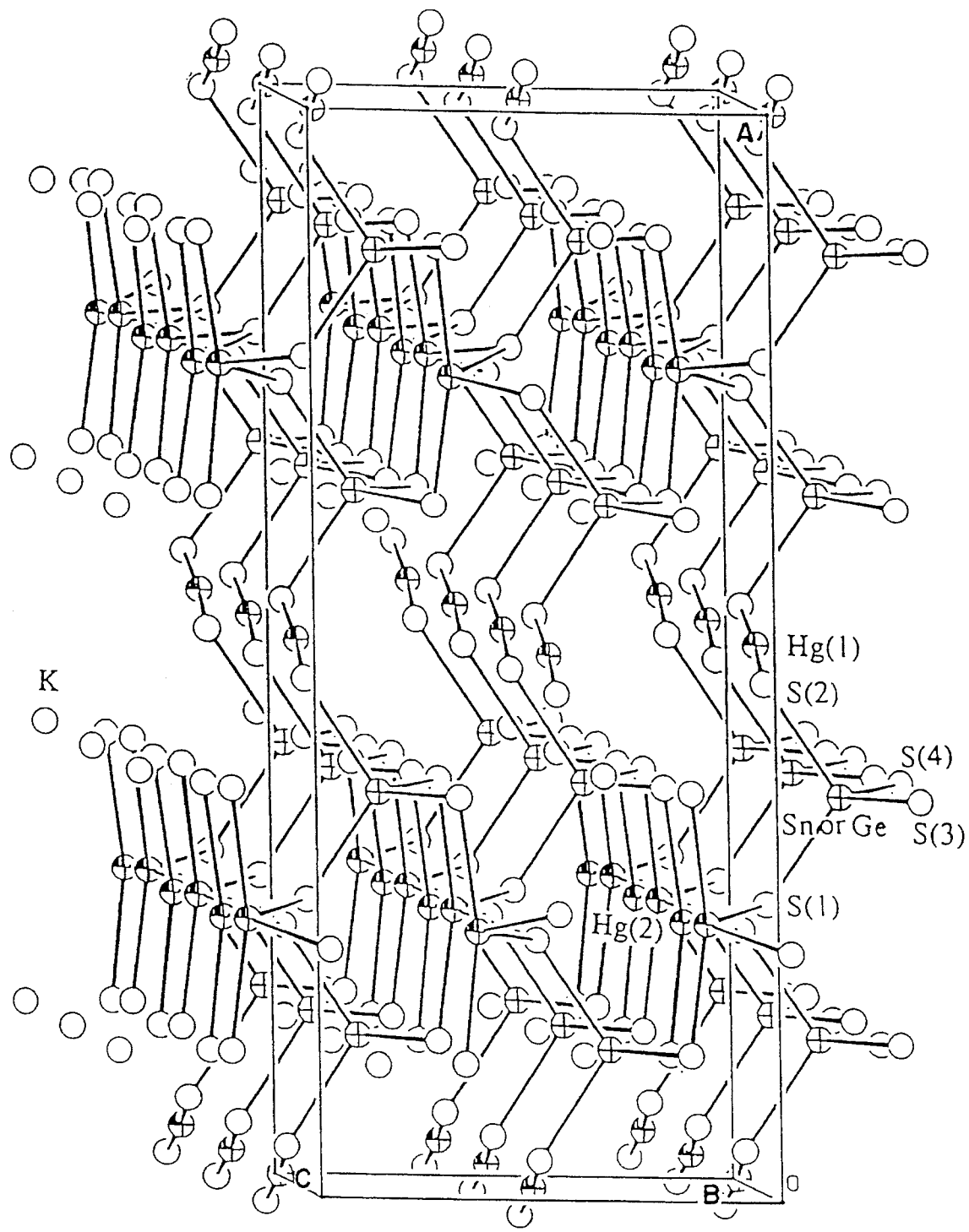
FIGS. 1 is a ORTEP representation and labeling scheme of $K_2Hg_3Sn_2S_8$ or $K_2Hg_3Ge_2S_8$ viewed down the b-axis.

Chalcogenide compounds (I) and (II) are isostructural with Sn and Ge occupying the same metal sites. They have complicated three-dimensional structures made up with tetrahedral $MS_4$ (M=Sn in (I) and Ge in (II)), linear $HgS_2$ and "saddle-like" $HgS_4$ which contains two short and two long Hg—S bonds. The structure of chalcogenide compound (I) or (II) is shown in FIG. 1. The structures of chalcogenide (I) and (II) are non-centrosymmetric. This can be readily seen by the fact that all S(1)—Hg(2)—S(1) and S(3)—M—S(4) (M=Sn or Ge) angles are pointed to the same direction, <001>, see FIG. 1. If the two long Hg(2)—S(1) bonds of the saddle-like $HgS_4$ units are not considered as bonds, the complicated three-dimensional framework can be simplified to a two-dimensional sheet, as shown in Scheme I.

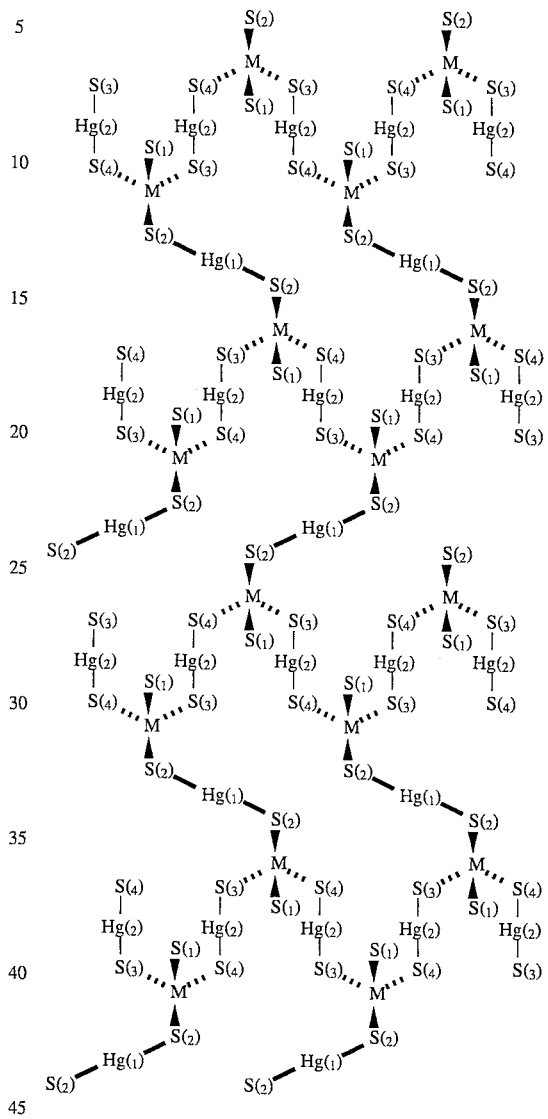

Figure 2:
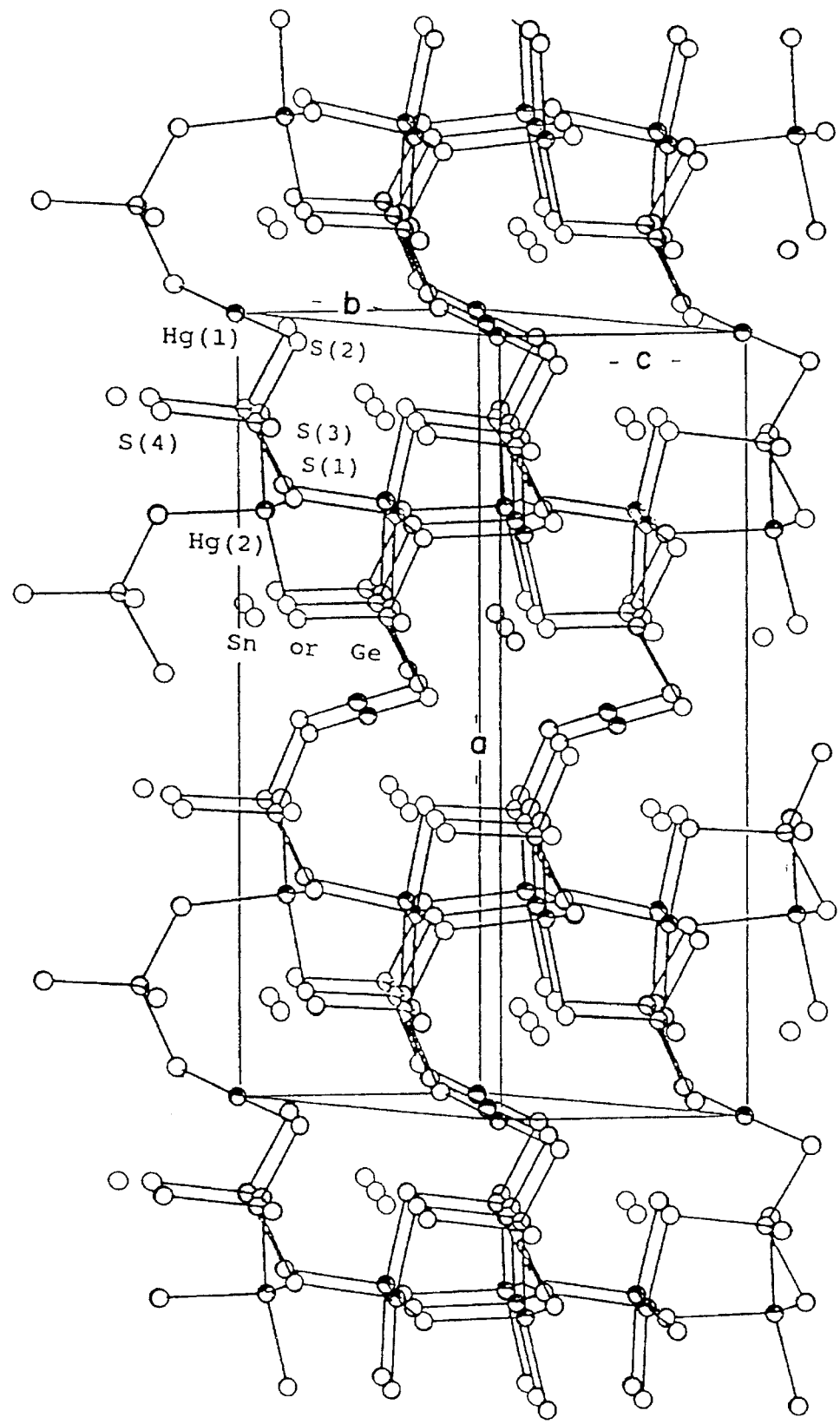
FIG. 2 is an ORTEP representation and labeling scheme of $K_2Hg_3Sn_2S_8$ or $K_2Hg_3Ge_2S_8$ viewed down the <110> direction.

The two-dimensional sheet is constructed by rows of parallel S(3)—Hg(2)—S(4) fragments linked alternately by $MS_4$ (M=Sn or Ge) tetrahedra in a corner-sharing fashion to form wave-like chains running in a sequence of S(3)—Hg(2)—S(4)—M—S(3)—Hg(2). These parallel wave-like chains are then extended to $(Hg_3M_2S_8)^{2-}$ sheets by connecting the S(2) atoms of $MS_4$ tetrahedra through linear S(2)—Hg(1)—S(2) units. These two-dimensional sheets are further expanded to three-dimensional networks via weak Hg(2)—S(1) bondings between two adjacent $(Hg_3M_2S_8)^{2-}$ sheets. This forms parallel tunnels, enclosed by edge-sharing 20-membered rings which contains edges of four $MS_4$ tetrahedra, two linear $HgS_2$ and four saddle-like $HgS_4$ units, running along the <011> crystallographic direction. $K^+$ cations are located in the tunnels, as shown in FIG. 2.

A comparison of the selected bond distances and bond angles between chalcogenide compounds (I) and (II) are given in Table 7.

TABLE 7

Comparison of Selected bond Distances (Å) and Angles (deg) of $K_2Hg_3Sn_2S_8$ (I) and $K_2Hg_3Ge_2S_8$ (II) with Standard Deviations in Parentheses

|  | (I) | (II) |
| --- | --- | --- |
| Selected Bond Distances (Å) | | |
| Hg(1)—S(2) | 2.331(6) | 2.361(8) |
| Hg(2)—S(1) | 2.787(7) | 2.778(9) |
| Hg(2)—S(1) | 2.818(6) | 2.85(1) |
| Hg(2)—S(3) | 2.419(5) | 2.436(9) |
| Hg(2)—S(4) | 2.432(5) | 2.436(9) |
| M—S(1) | 2.356(6) | 2.18(1) |
| M—S(2) | 2.426(6) | 2.25(1) |
| M—S(3) | 2.390(7) | 2.22(1) |
| M—S(4) | 2.377(6) | 2.23(1) |
| mean(M—S) | 2.39(3) | 2.22(3) |
| K—S(1) | 3.217(8) | 3.23(1) |
| K—S(2) | 3.37(1) | 3.32(2) |
| K—S(2) | 3.215(8) | 3.20(1) |
| K—S(3) | 3.304(9) | 3.34(1) |
| K—S(3) | 3.452(9) | 3.38(1) |
| K—S(4) | 3.163(9) | 3.16(1) |
| K—S(4) | 3.545(9) | 3.46(1) |
| mean(K—S) | 3.32(14) | 3.30(11) |
| Selected Bond Angles (deg) | | |
| S(3)—M—S(4) | 113.6(2) | 113.0(4) |
| S(2)—Hg(1)—S(2) | 177.0(4) | 177.8(7) |
| S(1)—Hg(2)—S(1) | 124.7(3) | 119.9(5) |
| S(1)—Hg(2)—S(3) | 98.6(2) | 100.8(3) |
| S(1)—Hg(2)—S(4) | 88.8(20) | 89.3(3) |
| S(1)—Hg(2)—S(3) | 91.5(2) | 91.5(3) |
| S(1)—Hg(2)—S(4) | 93.3(2) | 94.3(3) |
| S(3)—Hg(2)—S(4) | 166.8(2) | 163.8(3) |
| S(1)—M—S(2) | 11.5(2) | 112.0(4) |
| S(1)—M—S(3) | 110.5(2) | 111.7(4) |
| S(1)—M—S(4) | 109.2(2) | 110.1(4) |
| S(2)—M—S(3) | 107.1(2) | 107.3(4) |
| S(2)—M—S(4) | 104.9(2) | 102.4(4) |
| Hg(1)—S(2)—M | 97.9(2) | 99.1(4) |
| Hg(2)—S(3)—M | 99.8(2) | 101.0(4) |
| Hg(2)—S(4)—M | 102.0(2) | 102.5(3) |
| Hg(2)—S(1)—Hg(2) | 122.8(3) | 117.6(5) |
| Hg(2)—S(1)—M | 108.9(2) | 110.8(4) |
| Hg(2)—S(1)—M | 113.6(2) | 115.2(3) |

*M = Sn (I) or Ge (II)

The average Sn—S distance is 2.39 (3) Å while the average Ge—S distance is shorter at 2.22(3) Å. The S—M—S angles are close to those of a perfect tetrahedron. There are two distinct Hg atoms. Hg(1) adopts linear coordination with the Hg(1)—S(2) distances at 2.331(6) Å and 2.361(8) Å, the S(2)—Hg(1)—S(2) angles at 177.0(4)° and 177.8(7)° for chalcogenide compounds (I) and (II), respectively. The linear geometry of $HgS_2$ is common for thiomercurates and has been found in HgS (cinnabar)[12], $BaHgS_2$[13] $A_2Hg_3S_4$ (A=Na, K) and $K_2Hg_6S_7$[2g]. The Hg—S distances and S—Hg—S angles found in chalcogenide compounds (I) and (II) are comparable to those found in these compounds. Hg(2) is four coordinated and adopts a saddle-like geometry which has two short and two long Hg—S bonds, the former averaging 2.426(9) Å and 2.436(9) Å, the latter averaging 2.80(2) Å and 2.81(5) Å for chalcogenide compounds (I) and (II), respectively. This coordination type of $HgS_4$ is novel and has not been observed in other thiomercurates. The angles between the two short Hg—S bonds in (I) and (II) are 166.8(2)° and 163.8(3) Å respectively, which still possess some character of linearity. The deviations from perfect linearity are caused by the formation of two long Hg—S bonds between Hg(2) and S(1) atoms which are actually shared with tetrahedral $MS_4$ (M=Sn or Ge). The two short Hg—S bond distances fall between those in normal linear $HgS_2$ (ca. 2.35 Å) and tetrahedral $HgS_4$ (ca. 2.55 Å). Therefore, the coordination geometry of Hg(2) may be considered as an intermediate between tetrahedral $HgS_4$ and linear $HgS_2$ having short contacts with two S atoms.

The $K^+$ cations of chalcogenide compounds (I) and (II) are both surrounded by seven sulfur atoms with the average $K^+ \cdots S$ distances at 3.32(14) Å and 3.30(11) Å respectively.

Structure of $K_6Zn_4Sn_5S_{17}$ (III)—Example 3

Figure 3:
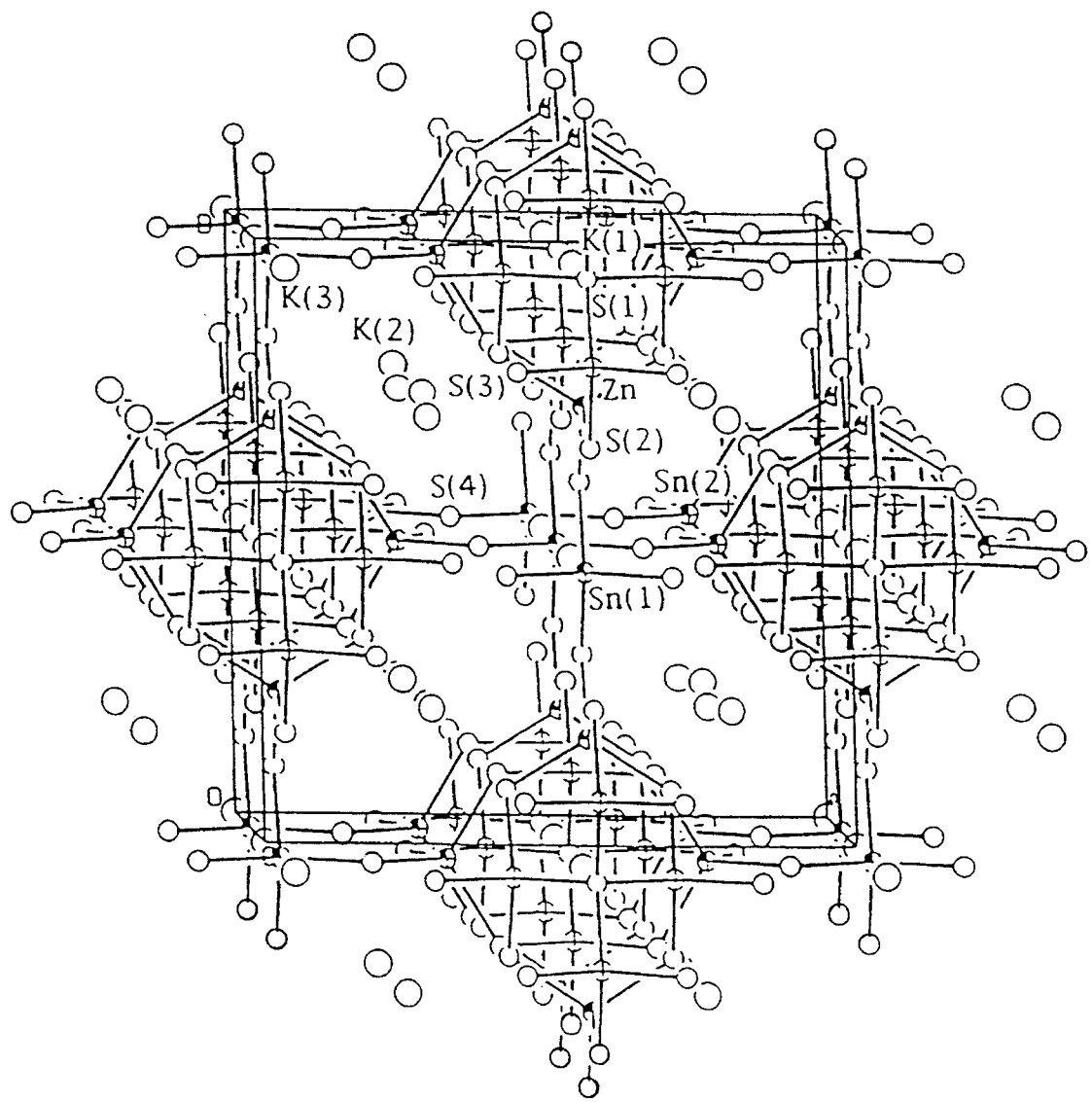
FIG. 3 is an ORTEP representation and labeling scheme of $K_6Zn_4Sn_5S_{17}$ viewed down the c-axis.
Figure 4:
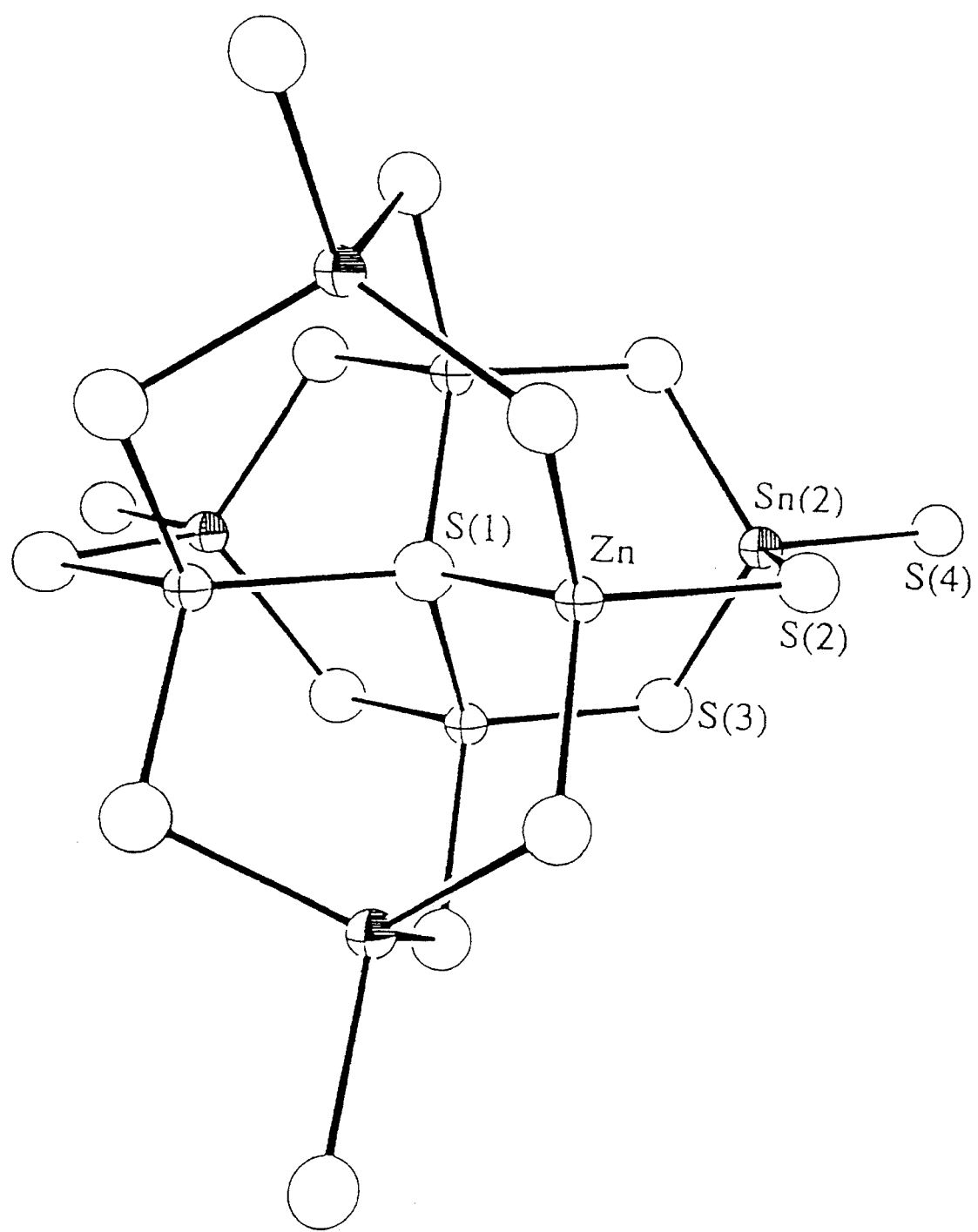
FIG. 4 is a representation of a $(Zn_4Sn_4S_{17})^{10-}$ cluster, which is the building block of $K_6Zn_4Sn_5S_{17}$.

Chalcogenide compound (III) has a complicated three-dimensional structure which is made up by linking tetrahedrally coordinated $Sn^{4+}$ ions and $(Zn_4Sn_4S_{17})^{10-}$ clusters via sulfur atoms in a vertex-sharing fashion, as shown in FIG. 3. The $(Zn_4Sn_2S_{17})^{10-}$ cluster, shown in FIG. 4, actually features fused boat-form six-membered rings. It contains a sulfur atom at its center tetrahedrally bonded to four Zn atoms. The four triangular faces of the $(SZn_4)^{6+}$ tetrahedron are then capped with four $(SnS_4)^{4-}$ tetrahedra in a face-sharing fashion. The resulting $(Zn_4Sn_2S_{17})^{10-}$ clusters possess pseudo-tetrahedral site symmetry and are practically functioning as huge tetrahedral $(MS_4)^{10-}$ (M=$(Zn_4Sn_4S_{13})$) building blocks. The linkage of $Sn^{4+}$ and $(Zn_4Sn_4S_{17})^{10-}$ generates three different types of tunnels in which charge balancing potassium cations are located: type (a) is formed by connecting $Sn^{4+}$ and $(MS_4)^{10-}$ tetrahedra in a helix way along a $2_1$ screw axis in the <001> crystallographic direction (see FIG. 3); type (b) is wide and flat and is enclosed by four $(M/SnS_4)$ chains running along <010> or <100> axis (see FIG. 5); type (c) is formed by connecting $Sn^{4+}$ and $(MS_4)^{10-}$ tetrahedra in a helix way along a pseudo-$3_1$ screw axis in the <010> or <110> direction (see FIG. 6). (III) crystallizes in a noncentrosymmetric tetragonal space group. Four fold improper rotation axes pass through the Sn(1) atom of the $(SnS_4)^{4-}$ units and S(1) atoms at the center of $(Zn_4Sn_4S_{17})^{10-}$ clusters. The absence of center of symmetry is clearly visible in FIG. 5.

Selected bond distances and angles are given in Table 8. The average Sn—S and Zn—S distances are 2.40(3) Å and 2.339(9) Å, respectively. The S—M—S angles do not deviate very much from those of a perfect tetrahedron. Only slight deviations occur at Sn(1) and S(1) and reduce the site symmetry from $T_d$ to $S_4$.

There are three crystallographically distinct potassium cations. K(1) is sandwiched by two $(Zn_4Sn_4S_{17})^{10-}$ clusters, each providing four S(3) atoms for coordination. K(2) is located at the intersection of two sets of tunnels running along the crystallographic <001> axis and <010> (or <110>) axis. K(3) is located between two K(2)'s in the same tunnels running along <110> or <1$\bar{1}$0> axis, as shown in FIG. 6. All potassium cations are eight-coordinated. The average K—S for K(1) and K(2) is normal at 3.37(12) Å. K(3) is located in a wider cavity inside the tunnels, surrounded by four S(2) atoms from four $(Zn_4Sn_4S_{17})^{10-}$ clusters and four S(4) atoms from two $(SnS_4)^{4-}$ tetrahedra. The size of the cavity is however too large for a $K^+$ cation (the center is 3.784 Å to S(2) and 3.944 Å to S(4)). The crystallographic data suggests that K(3) is not localized at a certain position but "rattling" around the center of the cavity.

TABLE 8

Selected Bond Distances (Å) and Angles (deg) for
$K_6Zn_4Sn_5S_{17}$ with Standard Deviations in Parentheses

| Selected Bond Distances (Å) | |
|---|---|
| Sn(1)—S(4) | 2.402(6) × 4 |
| Sn(2)—S(2) | 2.372(6) |
| Sn(2)—S(3) | 2.369(4) × 2 |
| Sn(2)—S(4) | 2.448(6) |
| mean(Sn—S) | 2.40(3) |
| Zn—S(1) | 2.342(2) |
| Zn—S(2) | 2.350(6) |
| ZN—S(3) | 2.332(4) × 2 |
| mean(Zn—S) | 2.339(9) |
| K(1)—S(3) | 3.431(4) × 8 |
| K(2)—S(2) | 3.381(1) × 2 |
| K(2)—S(3) | 3.358(4) × 2 |
| K(2)—S(3) | 3.116(5) × 2 |
| mean(K(1,2)—S) | 3.37(12) |
| K(3)—S(2) | 3.784(6) × 4 |
| K(3)—S(4) | 3.944(5( × 4 |
| mean(K(3)—S) | 3.86(11) |
| Selected Bond Angles (deg) | |
| S(4)—Sn(1)—S(4) | 109.1(1) × 4 |
| S(4)—Sn(1)—S(4) | 110.2(3) × 2 |
| S(2)—Sn(2)—S(3) | 113.3(1) × 2 |
| S(2)—Sn(2)—S(4) | 111.7(2) |
| S(3)—Sn(2)—S(3) | 111.8(2) |
| S(3)—Sn(2)—S(4) | 102.9(2) × 2 |
| S(3)—Sn(2)—S(4) | 102.9(1) |
| S(1)—Zn—S(2) | 112.5(2) |
| S(1)—Zn—S(3) | 110.6(1) × 2 |
| S(2)—Zn—S(3) | 107.2(1) × 2 |
| S(3)—Zn—S(3) | 108.5(2) |
| Zn—S(1)—Zn | 109.30(5) × 4 |
| Zn—S(1)—Zn | 109.8(1) × 2 |
| Sn(2)—S(2)—Zn | 102.6(2) |
| Sn(2)—S(3)—Zn | 104.9(1) |
| Sn(1)—S(4)—Sn(2) | 103.6(2) |

$Rb_2ZnSn_2S_6$ (IV) and $Cs_2MnSn_2S_6$ (V) (Examples 4 and 5)

Chalcogenide compounds (IV) and (V) are isostructural, forming a new three-dimensional structure type with corner-sharing tetrathiometalates as building blocks, as shown in FIG. 7. In order to have a better view of the structure, it can be divided into layers perpendicular to the b-axis, as shown in FIG. 8. Each layer is related to its adjacent layer by a two-fold improper rotation symmetry parallel to the b-axis, thus resulting in a noncentrosymmetric space group ($P2_1$, #4). A such discrete layer consists of slightly twisted boat-shaped $((MSn_2S_3)S_6)^{4-}$ (M=Mn or Zn) six-membered rings connected by sharing four of their six terminal sulfur atoms. The remaining two axial sulfur atoms, S(6), link the adjacent layers above and below, extending to three-dimensional frameworks and forming parallel tunnels running along <100> and <001> axes. These tunnels are narrow in width (~3.2 Å) so free movement of $Cs^+$ or $Rb^+$ cations along the tunnels is not expected. The charge balancing cations are located at the cavities near the boundary of the tunnels.

Selected bond distances and angles for chalcogenide compounds (IV) and (V) are given in Tables 9 and 10 respectively.

TABLE 9

Selected Bond Distances (Å) and Angles (deg) for
$Rb_2ZnSn_2S_6$ with Standard Deviations in Parentheses

| Selected Bond Distances (Å) | |
|---|---|
| Sn(1)—S(1) | 2.346(4) |
| Sn(1)—S(2) | 2.413(4) |
| Sn(1)—S(4) | 2.352(4) |
| Sn(1)—S(6) | 2.451(4) |
| Sn(2)—S(2) | 2.409(4) |
| Sn(2)—S(3) | 2.373(4) |
| Sn(2)—S(5) | 2.349(4) |
| Sn(2)—S(6) | 2.408(4) |
| mean(Sn—S) | 2.39(4) |
| Zn—S(1) | 2.359(4) |
| Zn—S(3) | 2.357(4) |
| Zn—S(4) | 2.352(4) |
| Zn—S(5) | 2.355(4) |
| mean(Zn—S) | 2.356(3) |
| Rb(1)—S(2) | 3.704(4) |
| Rb(1)—S(2) | 3.602(4) |
| Rb(1)—S(3) | 3.235(4) |
| Rb(1)—S(4) | 3.437(4) |
| Rb(1)—S(5) | 3.376(5) |
| Rb(1)—S(6) | 3.686(4) |
| Rb(2)—S(1) | 3.419(4) |
| Rb(2)—S(3) | 3.585(4) |
| Rb(2)—S(3) | 3.481(4) |
| Rb(2)—S(4) | 3.298(4) |
| Rb(2)—S(5) | 3.469(4) |
| Rb(2)—S(6) | 3.690(5) |
| Rb(2)—S(6) | 3.724(5) |
| mean(Rb—S) | 3.51(16) |
| Selected Bond Angles (deg) | |
| S(1)—Sn(1)—S(2) | 117.4(1) |
| S(1)—Sn(1)—S(4) | 110.8(1) |
| S(1)—Sn(1)—S(6) | 112.2(1) |
| S(2)—Sn(1)—S(4) | 113.5(1) |
| S(2)—Sn(1)—S(6) | 92.2(1) |
| S(4)—Sn(1)—S(6) | 109.3(1) |
| S(2)—Sn(2)—S(3) | 101.3(1) |
| S(2)—Sn(2)—S(5) | 112.6(1) |
| S(2)—Sn(2)—S(6) | 106.5(1) |
| S(3)—Sn(2)—S(5) | 112.3(1) |
| S(3)—Sn(2)—S(6) | 108.6(1) |
| S(5)—Sn(2)—S(6) | 114.5(1) |
| S(1)—Zn—S(3) | 108.7(1) |
| S(1)—Zn—S(4) | 101.6(1) |
| S(1)—Zn—S(5) | 117.9(1) |
| S(3)—Zn—S(4) | 117.7(1) |
| S(3)—Zn—S(5) | 100.2(2) |
| S(4)—Zn—S(5) | 111.6(1) |
| Sn(1)—S(1)—Zn | 113.3(1) |
| Sn(1)—S(2)—Sn(2) | 109.5(1) |
| Sn(2)—S(3)—Zn | 113.1(2) |
| Sn(1)—S(4)—Zn | 114.2(2) |
| Sn(2)—S(5)—Zn | 111.7(1) |
| Sn(1)—S(6)—Sn(2) | 103.6(1) |

TABLE 10

Selected Bond Distances (Å) and Angles (deg) of
$Cs_2MnSn_2S_6$ with Standard Deviations in Parentheses

| Selected Bond Distances (Å) | |
|---|---|
| Sn(1)—S(1) | 2.349(9) |
| Sn(1)—S(2) | 2.424(8) |
| Sn(1)—S(4) | 2.342(8) |
| Sn(1)—S(6) | 2.439(8) |
| Sn(2)—S(2) | 2.396(8) |

TABLE 10-continued

Selected Bond Distances (Å) and Angles (deg) of $Cs_2MnSn_2S_6$ with Standard Deviations in Parentheses

| | |
|---|---|
| Sn(2)—S(3) | 2.361(8) |
| Sn(2)—S(5) | 2.343(8) |
| Sn(2)—S(6) | 2.423(8) |
| mean(Sn—S) | 2.38(4) |
| Mn—S(1) | 2.43(1) |
| Mn—S(3) | 2.457(9) |
| Mn—S(4) | 2.401(9) |
| Mn—S(5) | 2.459(9) |
| mean(Mn—S) | 2.44(3) |
| Cs(1)—S(1) | 3.581(9) |
| Cs(1)—S(2) | 3.904(9) |
| Cs(1)—S(2) | 3.80(1) |
| Cs(1)—S(3) | 3.373(8) |
| Cs(1)—S(4) | 3.558(9) |
| CS(1)—S(4) | 3.888(9) |
| Cs(1)—S(5) | 3.66(1) |
| CS(1)—S(5) | 3.97(1) |
| Cs(1)—S(6) | 3.746(8) |
| Cs(2)—S(1) | 3.815(9) |
| CS(2)—S(1) | 3.604(9) |
| Cs(2)—S(3) | 3.686(9) |
| Cs(2)—S(3) | 3.570(9) |
| Cs(2)—S(4) | 3.498(8) |
| Cs(2)—S(5) | 3.598(8) |
| Cs(2)—S(6) | 3.795(9) |
| Cs(2)—S(6) | 3.816(9) |
| mean(Cs—S) | 3.70(16) |
| Selected Bond Angles (deg) | |
| S(1)—Sn(1)—S(2) | 117.0(3) |
| S(1)—Sn(1)—S(4) | 110.7(3) |
| S(1)—Sn(1)—S(6) | 112.1(3) |
| S(2)—Sn(1)—S(4) | 113.1(3) |
| S(2)—Sn(1)—S(6) | 93.6(3) |
| S(4)—Sn(1)—S(6) | 109.0(3) |
| S(2)—Sn(2)—S(3) | 100.3(3) |
| S(2)—Sn(2)—S(5) | 115.6(3) |
| S(2)—Sn(2)—S(6) | 105.5(3) |
| S(3)—Sn(2)—S(5) | 112.2(3) |
| S(3)—Sn(2)—S(6) | 109.4(3) |
| S(5)—Sn(2)—S(6) | 113.0(3) |
| S(1)—Mn—S(3) | 110.5(3) |
| S(1)—Mn—S(4) | 103.0(3) |
| S(1)—Mn—S(5) | 115.5(3) |
| S(3)—Mn—S(4) | 117.8(3) |
| S(3)—Mn—S(5) | 98.4(3) |
| S(4)—Mn—S(5) | 112.3(3) |
| Sn(1)—S(1)—Mn | 115.7(3) |
| Sn(1)—S(2)—Sn(2) | 112.7(3) |
| Sn(2)—S(3)—Mn | 115.3(3) |
| Sn(1)—S(4)—Mn | 118.2(3) |
| Sn(2)—S(5)—Mn | 113.4(3) |
| Sn(1)—S(6)—Sn(2) | 104.3(3) |

The average Sn—S distances for (IV) and (V) are similar at 2.38(4) Å and 2.39(4) Å respectively and are comparable to those of other $(SnS_4)^{4-}$ containing compounds. The average Mn—S distance (2.44(3) Å) is significantly larger than that of Zn—S (2.356(3) Å). This explains why the lattice of (V) is stabilized by larger $Cs^+$ cations while chalcogenide compound (IV) is stabilized by $Rb^+$ cations. The coordination environments for $Cs^+$ and $Rb^+$ ions in chalcogenide compounds (V) and (VI) respectively are similar with average $Cs^+ \cdots S$ distance of 3.70(16) Å and average $Rb^+ \cdots S$ distance of 3.61(22) Å. The corresponding S—Sn—S and S—M—S (M=Zn or Mn) angles in (IV) and (V) are comparable and deviate from those of a perfect tetrahedra.

Even though it is possible that Sn and Mn or Zn are disordered at metal sites due to their similarity of ionic radii, their reasonable temperature factors based on the structure refinements of crystallographic data indicate an ordered model. The perfect paramagnetic behavior of (V) also suggests the current ordered model in which Mn atoms are separated by a Sn and two S atoms, resulting in negligible magnetic dipole-dipole coupling due to long Mn $\cdots$ Mn distances (7.098(1) Å, 7.434(1) Å and 7.842(1) Å). (IV) is diamagnetic because both $Sn^{4+}$ and $Zn^{2+}$ do not contain unpaired electrons.

Spectroscopy

Magnetic Susceptibility Measurements $Cs_2MnSn_2S_6$ (V)—Example 5

Measurements of magnetization versus applied magnetic field were performed at 5° K. and 300° K. At both temperatures, the magnetic susceptibilities of the sample were magnetic field independent up to 5000 Gauss, as shown in FIG. 9. Variable temperature magnetic susceptibility data were collected at a magnetic field of 5000 Gauss with an ascending temperature ramp from 5° K. to 300° K. FIGS. 10A and 10B show the relationship between the reciprocal of molar magnetic susceptibilities and temperatures. It exhibits Curie-Weiss behavior ($\chi=C/(T+\theta)$, where $\chi$ is magnetic susceptibility, C is Curie constant, T is the experimental temperature and $\theta$ is Weiss temperature, above the Néel temperature of 9° K. at which antiferromagnetic transition occurs. The slope of the straight line in the Curie-Weiss region gives the value C=4.21 (°K.-emu-mol$^{-1}$). The interception at the temperature axis from the extrapolated straight line give a $\theta$ value of −22.7° K. The effective magnetic moment, $\mu$eff, related to the number of unpaired electrons, is 5.78 BM, which is calculated using the equation: $\chi=(N\beta^2\mu^2)/(3k(T+\theta))$ or $\mu=2.828(\chi(T+\theta))^{1/2}$ when N, $\beta$ and k are substituted. (N: Avogrado's number; $\beta$: Bohr magneton; k=Boltzmann's constant). The theoretical magnetic moment, $\mu_s$, based on electron spin only, is given by $\mu_s=g(S+(S+1))^{1/2}$, where g=gyromagnetic ratio ~2.00, S=the sum of the spin quantum numbers for unpaired electrons. The calculated $\mu_s$ value, 5.92 BM, based on high spin $Mn^{2+}$ ions with S=5/2, is consistent with the observed result.

The UV-Vis-Near IR solid state spectra of chalcogenide compounds (I)–(V) exhibit steep absorption edges from which optical band gaps can be derived. The spectra are shown in FIG. 11. The summary of their optical band gaps are given in Table 11. The band gaps are all consistent with the colors. These results suggest all these compounds are semiconductors in nature.

The vibrational spectra and absorption frequencies for (I)–(V) are given in FIG. 12 and Table 12 respectively.

TABLE 11

Summary of the Optical Band Gaps (eV) for $K_2Hg_3Sn_2S_8$ (I), $K_2Hg_3Ge_2S_8$ (II), $K_6Zn_4Sn_5S_{17}$ (III), $Rb_2ZnSn_2S_6$ (IV), $Cs_2MnSn_2S_6$ (V), $Rb_2Hg_3Sn_2S_8$ (VI), $Rb_2Hg_3Ge_2S_8$ (VII).

| compound | Eg (eV) | color |
|---|---|---|
| $K_2Hg_3Sn_2S_8$ | 2.39 | bright yellow |
| $K_2Hg_3Ge_2S_8$ | 2.64 | light yellow |
| $K_6Zn_4Sn_5S_{17}$ | 2.94 | white |
| $Cs_2MnSn_2S_6$ | 2.58 | light brown |
| $Rb_2Hg_3Sn_2S_8$ | 2.40 | bright yellow |
| $Rb_2Hg_3Ge_2S_8$ | 2.65 | light yellow |

TABLE 12

Summary of Absorption Frequencies (cm$^{-1}$) of Vibrational Spectra for (I)–(V)[a]

| compound | frequency (cm$^{-1}$) |
|---|---|
| $K_2Hg_3Sn_2S_8$ | 383(s), 356(sh), 345(s), 316(w), 296(m), 169(m) |
| $K_2Hg_2Ge_2S_8$ | 421(s), 393(m), 377(s), 371(sh), 353(m), 312(m), 297(sh), 211(sh), 198(s), 148(2), 134(w) |
| $K_6Zn_4Sn_5S_{17}$ | 387(s), 361(m), 342(s), 307(w), 278(s), 262(sh), 153(m) |
| $Rb_2ZnSn_2S_6$ | 390(m), 380(m), 369(2), 351(m), 332(s), 321(w), 304(s), 275(m), 256(s), 142(s) |
| $Cs_2MnSn_2S_6$ | 381(s), 371(m), 366(m), 328(s), 318(w), 299(s), 278(m), 257(s), 139(m) |

[a](s): strong; (m): medium; (w): weak; (sh): shoulder

These quaternary compounds exhibit complicated spectra due to the many vibrational modes. All the absorption frequencies fall in the range between 130 cm$^{-1}$ and 450 cm$^{-1}$. This make it difficult for assignment. $K_2Hg_3Sn_2S_8$ (I) and $K_2Hg_3Ge_2S_8$ (II) are isostructural and therefore their vibrational spectra have similar patterns except that all the absorption bands shift, understandably, to higher frequencies in the spectrum of $K_2Hg_3Ge_2S_8$ (II). Another pair of isostructural compounds, $Rb_2ZnSn_2S_6$ (IV) and $Cs_2MnSn_2S_6$, also exhibit similar vibrational spectra with little shift of absorption frequencies.

EXAMPLE 6

$K_{1.6}Rb_{0.4}Hg_3Ge_2S_8$

β-$K_2Hg_3Ge_2S_8$ (space group C2) was synthesized using the molten salt ($K_xS_y$) flux reaction with the same approximate overall stoichiometry ($K_8Hg_{3-4}Ge_2S_{40}$) as α-$K_2Hg_3Ge_2S_8$ (space group Aba2, also acentric) but at higher temperatures or by substituting Rb for some or all of the K. Furthermore, there may be kinetic aspects to the 1st-order α→β phase transition associated with the amount of time the reaction is held at maximum temperature. Both phases with a variety of compositions have been prepared and are stable in water and air. These compounds are easily isolated in methanol and water and then dried with acetone and diethyl ether. The following table lists relevant information pertaining to syntheses of these compounds. The relative amounts of the α and β phases in two phase samples, as isolated, were estimated from visual inspection of X-ray powder diffraction plots.

| flux composition | T (°C.) | time at T | cooling rate °C./hr | estimated phase content % α | % β |
|---|---|---|---|---|---|
| $K_8Hg_4Ge_2S_{40}$ | 400 | 4 d | −4 | 100 | — |
| $K_8Hg_4Ge_2S_{40}$ | 450 | 4 d | −4 | 50 | 50 |
| $K_8Rb_{0.4}Hg_{4.3}Ge_2S_{43}$ | 400–385 | 5.5 d | −2 | 60 | 40 |
| $K_{6.9}Rb_{1.2}Hg_{4.2}Ge_2S_{40}$ | 400–385 | 5.5 d | −2 | 20 | 80 |
| $K_{6.2}Rb_{2.1}Hg_4Ge_2S_{42}$ | 400–385 | 5.5 d | −2 | 10 | 90 |
| $K_{5.6}Rb_{2.4}Hg_4Ge_2S_{40}$ | 400 | 4 d | −4 | — | 100 |
| $K_{4.8}Rb_{3.2}Hg_4Ge_2S_{40}$ | 400 | 4 d | −4 | — | 100 |
| $K_8Hg_{3.5}Ge_2S_{35}$ | 500 | 45 hr | −4 | 50 | 50 |
| $K_8Hg_4Sn_2S_{40}$ | 400 | 4 d | −4 | 100 | — |
| $K_8Hg_4Sn_2S_{40}$ | 500 | 45 hr | −4 | 100 | — |
| $K_8Hg_4Sn_2S_{40}$ | 460 | 4 d | −4 | 80 | 20 |
| $K_6Rb_2Hg_{3.5}Sn_2S_{40}$ | approx 400 | 4 d | −4 | 100 | — |

DTA results

| α-$K_2Hg_3Ge_2S_8$ | m.p. | 580° C. |
|---|---|---|
| | recrystallization | 430° C. |
| | XRD → β-phase | |
| | some decomposition | |
| | (small amount of HgS evident) | |
| α-$K_2Hg_3Sn_2S_8$ | m.p. | 545° C. |
| | recrystallization | 430° C. |
| | XRD → β-phase + impurities | |
| | some decomposition | |

Melting points were determined by differential thermal analysis. Heating and cooling rates were 10° C./min. β-$Rb_2Hg_3Ge_2S_8$ and β-$Rb_2Hg_3Sn_2S_8$ both form using flux reactions with the approximate composition $Rb_8Hg_4M_2S_{40}$ (M=Ge, Sn) at the cool end of a pyrex tube in a temperature gradient of 450°–500° C.

Crystal Data for $K_{1.6}Rb_{0.4}Hg_3Ge_2S_8$ z(β-$K_2Hg_3Ge_2S_8$ type)

| formula | $K_{1.6}Rb_{0.4}Hg_3Ge_2S_8$ |
|---|---|
| fw | 1099.71 |
| a, Å | 9.649(5) |
| b, Å | 8.393(2) |
| c, Å | 9.720(2) |
| α | 90.0 |
| β | 95.08(3) |
| γ | 90.0 |
| Z, V (Å$^3$) | 2, 7840(5) |
| space group | C2 #5 |
| $d_{calc}$ (g/cm$^3$) | 4.658 |
| crystal size, mm | 0.23 × 0.28 × 0.39 |
| Temp (°C.) | 23 |
| radiation | Mo Kα |
| μ(Mo Kα), cm$^{-1}$ | 356.05 |
| secondary ext coeff (10$^{-7}$) | 5.3(5) |
| scam mode | 2θ-ω |
| scan speed, °/min | 4 |
| 2θ max, deg | 50 |
| # data collected | 1027 |
| # unique data | 969 |
| # data observed, I > 3σ(I) | 883 |
| # variables | 71 |
| R/R$_w$, % | 3.8/4.6 |
| R/R$_w$, % (incl unobs refl) | 4.6/4.7 |
| GOF | 1.79 |
| residual e- density (pos) | +1.897 |
| residual e- density (neg) | −2.134 |

Positional and Thermal parameters for $K_{1.6}Rb_{0.4}Hg_3Ge_2S_8$ (β-$K_2Hg_3Ge_2S_8$ type)

| atom | x | y | z | B(eq) |
|---|---|---|---|---|
| A | 0.2124(4) | 0.1520(6) | 0.2270(4) | 1.7(2) |
| Hg1 | 0 | 0.3592 | 0.5 | 1.94(5) |
| Hg2 | 0 | 0.8427(3) | 0.5 | 2.04(5) |
| Hg3 | 0 | 0.5229(3) | 0 | 1.45(4) |
| Ge | 0.2336(2) | 0.6623(3) | 0.2712(2) | 0.74(7) |
| S1 | 0.7536(5) | 0.0192(8) | 0.4588(5) | 1.3(2) |
| S2 | 0.2366(5) | 0.5162(8) | 0.0796(5) | 1.2(2) |
| S3 | 0.4193(5) | 0.8187(7) | 0.2609(6) | 1.2(2) |
| S4 | 0.5364(6) | 0.2995(7) | 0.2574(6) | 1.3(2) | atom A was refined as 80(4) % K: 20% Rb

In a similar manner the following chalcogenide compounds are prepared: $K_{2-x}Cs_xHg_3Sn_2S_8$, wherein x is 0<x<0.5; $K_{2-x}Rb_xHg_3Ge_2S_8$, wherein x is 0<x<1; $K_{2-x}Cs_xGe_2S_8$, wherein 0<x<0.5; $K_{1-x}Rb_xHg_3Ge_{2-y}Sn_yS_8$, wherein x is 0<x<1 and y is 0<y<2; $Rb_2Hg_3Sn_2S_8$; $Rb_2Hg_3Ge_2S_8$; $Cs_2MnSn_2Se_6$; $Rb_2ZnSn_2Se_6$; $K_6Zn_4Sn_5Se_{17}$; $K_2Hg_3Ge_2Se_8$; $K_2Hg_3Sn_2Se_8$; $K_{1-x}Rb_xHg_3Ge_2S_{8-y}Se_y$; and $Rb_2Hg_3Sn_2Se_8$.

EXAMPLE 7

Large Crystal Growth of $K_2Hg_3Ge_2S_8$ and $K_2Hg_3Sn_2S_8$ Recrystallization from $K_2S_8$ Flux 0.20 g ($1.9\times10^{-4}$ mole) of $K_2Hg_3Ge_2S_8$ powder was mixed with $1.9\times10^{-4}$ mole of $K_2S_8$ (0.032 g of $K_2S_3$ and 0.03 g of S) and loaded in a Pyrex tube. The tube was flame-sealed under vacuum. It was heated slowly to 420° C. and kept at 420° C. for 4 days and then cooled down to 200° C. at a cooling rate of $-2°$ C./hour. The product was isolated by washing with DMF and dried with acetone and ether under $N_2$. 0.145 g of large (~3 mm in size) yellow plate-like crystals were obtained. X-ray powder diffraction pattern of the crystals confirms that the yellow plates are $K_2Hg_3Ge_2S_8$.

The mixtures of $K_2Hg_3Ge_2S_8$ powder and $K_2S_8$ in 1:3 and 1:5 ratios under the same reaction conditions also gave $K_2Hg_3Ge_2S_8$ crystals. However, the crystal size and yield was smaller when more $K_2S_8$ was used.

The reactions $K_2Hg_3Sn_2S_8$ powder in $K_2S_8$ fluxes under the same conditions also gave large $K_2Hg_3Sn_2S_8$ crystals.

Crystal Growth from Slow Cooling

Large crystals of $K_2Hg_3Ge_2S_8$ (up to $4\times5\times8$ mm$^3$) and $K_2Hg_3Sn_2S_8$ (up to $4\times4\times5$ mm$^3$) have been prepared from flux reactions using the overall stoichiometry $K_8Hg_4Mg_2S_{40}$ where M=Ge or Sn. The samples were initially heated to 500° C. over an eight hour period and then cooled to 400° C. in two hours. They were held at the 400° C. isotherm temperature for 6 days and subsequently cooled at $-1°$ C./hr to 200° C. followed by cooling to room temperature in two hours. The initial heating to 500° C. presumably dissolved most of the seed crystals which formed as the temperature was increased. Upon isotherming and cooling, material deposited upon only a few seeds resulting in only a few large crystals. Much slower cooling (<0.1° C./hr) and/or longer isotherms can lead to still larger crystals.

It is intended that the foregoing description be only illustrative of the present invention and that the present invention be limited only by the hereinafter appended claims.

We claim:

1. A crystalline alkali metal quaternary chalcogenide of the formula $A_xB_yC_zD_n$ containing $(CD_4)^{4-}$ or $(C_2D_6)^{4-}$ ions where A is selected from the group consisting of an alkali metal and a mixture of alkali metals, B is selected from the group consisting of mercury, zinc and manganese, C is a metal selected from the group consisting of germanium and tin and D is selected from the group consisting of sulfur and selenium, wherein x is a number selected from the group consisting of 2 and 6, y is a number selected from the group consisting of 1, 3 and 4, z is a number selected from the group consisting of 2 and 5 and n is a number selected from the group consisting of 6, 8 and 17 which provide non-linear optical transmission properties.

2. A chalcogenide compound having the empirical formula:

$$A_xB_yC_zD_n$$

wherein A is selected from the group consisting of an alkali metal and a mixture of alkali metals, B is selected from the group consisting of mercury, zinc and manganese, C is a metal selected from the group consisting of germanium and tin and D is selected from the group consisting of sulfur and selenium, and wherein x is a number selected from the group consisting of 2 and 6, y is a number selected from the group consisting of 1, 3 and 4, z is a number selected from the group consisting of 2 and 5 and n is a number selected from the group consisting of 6, 8 and 17.

3. A chalcogenide compound having the empirical formula $K_2Hg_3Sn_2S_8$.

4. A chalcogenide compound having an empirical formula $K_{2-x}Rb_xHg_3Sn_2S_8$, wherein x is 0<x<1.

5. A chalcogenide compound having an empirical formula $K_{2-x}Cs_xHg_3Sn_2S_8$, wherein x is 0<x<0.5.

6. A chalcogenide compound having an empirical formula $K_2Hg_3Ge_2S_8$.

7. A chalcogenide compound having an empirical formula $K_{2-x}Rb_xHg_3Ge_2S_8$, wherein x is 0<x<1.

8. A chalcogenide compound having an empirical formula $K_{2-x}Cs_xGe_2S_8$, wherein x is 0<x<0.5.

9. A chalcogenide compound having an empirical formula $K_{1-x}Rb_xHg_3Ge_{2-y}Sn_yS_8$, wherein x is 0<x<1 and y is 0<y<2.

10. A chalcogenide compound having an empirical formula $Rb_2Hg_3Sn_2S_8$.

11. A chalcogenide compound having an empirical formula $Rb_2Hg_3Ge_2S_8$.

12. A chalcogenide compound having an empirical formula $Cs_2MnSn_2Se_6$.

13. A chalcogenide compound having an empirical formula $Rb_2ZnSn_2Se_6$.

14. A chalcogenide compound having an empirical formula $K_6Zn_4Sn_5Se_{17}$.

15. A chalcogenide compound having an empirical formula $K_2Hg_3Ge_2Se_8$.

16. A chalcogenide compound having an empirical formula $K_2Hg_3Sn_2Se_8$.

17. A chalcogenide compound having an empirical formula $Cs_2MnSn_2S_6$.

18. A chalcogenide compound having an empirical formula $Rb_2ZnSn_2S_6$.

19. A chalcogenide compound having an empirical formula $K_6Zn_4Sn_5S_{17}$.

20. A chalcogenide compound having an empirical formula $K_{1-x}Rb_xHg_3Ge_2S_{8-y}Se_y$, wherein x is 0<x<1 and wherein y is 0<y<8.

21. A chalcogenide compound having an empirical formula of $Rb_2Hg_3Sn_2Se_8$.

22. In a method including transmission of light through a crystal for analytical purposes, the improvement which comprises transmitting the light in a visible light and infrared light range between 0.4 and 20 μm through a crystal of a chalcogenide compound having the formula:

$$A_xB_yC_zD_n$$

wherein A is selected from the group consisting of an alkali metal and a mixture of alkali metals, B is selected from the group consisting of mercury, zinc and manganese, C is a metal selected from the group consisting of germanium and tin and D is selected from the group consisting of sulfur and selenium, and wherein x is a number selected from the group consisting of 2 and 6, y is a number selected from the group consisting of 1, 3 and 4, z is a number selected from the group consisting of 2 and 5 and n is a number selected from the group consisting of 6, 8 and 17, wherein the light into the crystal and the light out of the crystal change with frequency of the light into the crystal in a non-linear manner.

23. The method of claim 22 wherein the visible laser light is converted to the infrared light.

24. The method of claim 22 wherein the light transmitted is selected from the group consisting of infrared and visible.

25. The method of claim 22 wherein infrared laser light is converted to visible light.

* * * * *

UNITED STATES PATENT AND TRADEMARK OFFICE
CERTIFICATE OF CORRECTION

PATENT NO. : 5,531,936

DATED : July 2, 1996

INVENTOR(S) : Mercouri G. Kanatzidis, Ju H. Liao, and Gregory A. Marking

Page 1 of 2

It is certified that error appears in the above-identified patent and that said Letters Patent is hereby corrected as shown below:

Column 11, line 29 (Table 7), "88.8(20" should be --88.8(2)--.

Column 11, line 32 (Table 7), "11.5(2)" should be --111.5(2)--.

Column 12, line 18, "($Zn_4Sn_2S_{17}$)" should be --($Zn_4Sn_4S_{17}$)--.

Column 12, line 24 "($Zn_4Sn_2S_{17}$)" should be --($Zn_4Sn_4S_{17}$)--.

Column 13, line 19 (Table 8), "3.944(5(x4" should be --3.944(5) x 4--.

Column 14, line 17 (Table 9), after "mean (zn -S)" the following should be inserted --Rb(1)-S(1) . . . . . . 3.466(4)--.

Column 16, line 64 (Table 11), after "$K_6Zn_4Sn_4S_{17}$" the following should be inserted --$Rb_2ZnSn_2S_6$ . . . . 3.00. . . . white--.

Column 17, line 8 (Table 12), "148(2)" should be --148(w)--.

Column 17, line 12 (Table 12), "369(2)" should be --369(s)--.

UNITED STATES PATENT AND TRADEMARK OFFICE
CERTIFICATE OF CORRECTION

PATENT NO. : 5,531,936
DATED : July 2, 1996
INVENTOR(S) : Mercouri G. Kanatzidis, Ju H. Liao, and Gregory A. Marking It is certified that error appears in the above—identified patent and that said Letters Patent is hereby corrected as shown below:

Column 18, line 17, "$Ge_2S_8$ z" should be --$Ge_2S_8$--.

Column 18, line 25, "7840(5)" should be --784.0(5)--.

Signed and Sealed this

Twenty-sixth Day of November 1996

Attest:

BRUCE LEHMAN

Attesting Officer    Commissioner of Patents and Trademarks